(12) United States Patent
Deoalikar et al.

(10) Patent No.: US 8,149,094 B2
(45) Date of Patent: Apr. 3, 2012

(54) CLUSTERING METHODS FOR RADIO-FREQUENCY-IDENTIFIER NETWORKS

(75) Inventors: Vinay Deoalikar, Mountain View, CA (US); John Recker, Mountain View, CA (US); Malena Mesarina, San Francisco, CA (US); Salil Pradhan, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1373 days.

(21) Appl. No.: 11/799,146

(22) Filed: Apr. 30, 2007

(65) Prior Publication Data

US 2008/0136639 A1 Jun. 12, 2008

Related U.S. Application Data

(63) Continuation-in-part of application No. 11/635,738, filed on Dec. 6, 2006.

(51) Int. Cl.
*H04Q 5/22* (2006.01)

(52) U.S. Cl. ............... 340/10.2; 340/572.1; 340/10.4

(58) Field of Classification Search ............ 340/10.1, 340/10.2, 10.3, 10.6, 572.1, 572.4; 370/370; 238/385

See application file for complete search history.

(56) References Cited

U.S. PATENT DOCUMENTS

| | | | |
|---|---|---|---|
| 7,026,935 B2 * | 4/2006 | Diorio et al. | 340/572.2 |
| 7,623,036 B2 * | 11/2009 | Onderko et al. | 340/572.1 |
| 7,667,572 B2 * | 2/2010 | Husak et al. | 340/10.1 |
| 7,667,575 B2 * | 2/2010 | Husak et al. | 340/10.2 |
| 7,692,532 B2 * | 4/2010 | Fischer et al. | 340/10.2 |
| 7,817,014 B2 * | 10/2010 | Krishna et al. | 340/10.4 |
| 7,898,391 B2 * | 3/2011 | Maguire et al. | 340/10.2 |
| 7,969,282 B2 * | 6/2011 | Powell et al. | 340/10.2 |
| 2002/0175805 A9 * | 11/2002 | Armstrong et al. | 340/10.31 |
| 2005/0088284 A1 * | 4/2005 | Zai et al. | 340/10.2 |
| 2006/0022800 A1 * | 2/2006 | Krishna et al. | 340/10.2 |
| 2006/0076401 A1 * | 4/2006 | Frerking | 235/380 |
| 2006/0114104 A1 * | 6/2006 | Scaramozzino | 340/10.2 |
| 2006/0175407 A1 * | 8/2006 | Kinoshita | 235/451 |
| 2007/0046467 A1 * | 3/2007 | Chakraborty et al. | 340/572.1 |
| 2007/0139162 A1 * | 6/2007 | Bandy et al. | 340/10.2 |
| 2008/0136638 A1 * | 6/2008 | Deolaliker et al. | 340/572.1 |
| 2008/0180247 A1 * | 7/2008 | Deoaliker et al. | 340/572.1 |

* cited by examiner

*Primary Examiner* — Benjamin C Lee
*Assistant Examiner* — Peter Mehravari

(57) ABSTRACT

Methods and systems of the present invention are directed to clustering RFID-tag readers of a multi-RFID-tag-reader network in order to obtain a set of RFID-tag readers with high probability of detecting an event, but with low probability of collisions and with an acceptable cost. The cost may be determined by any of numerous cost functions of the RFID-tag readers in the set of RFID-tag readers, and may represent a cost in power, long-term reliability, and other such metrics that may be applied to an RFID-tag network.

13 Claims, 41 Drawing Sheets

$\beta_0(G) = 3$ $\chi(G) = 3 = \min k$
for which $V = \cup V_i$
$i = 1$ to $k$
and each $V_i$ is independent

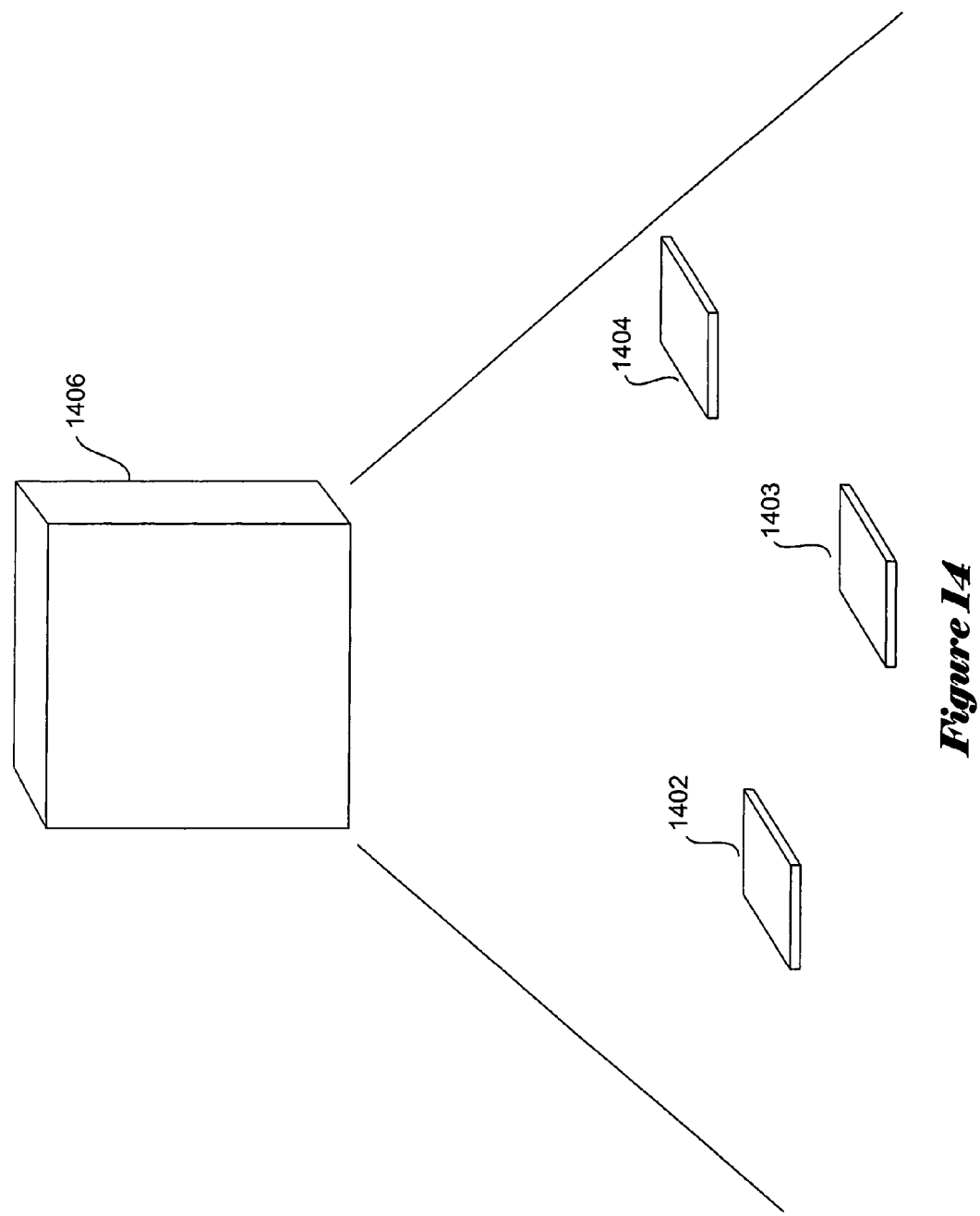

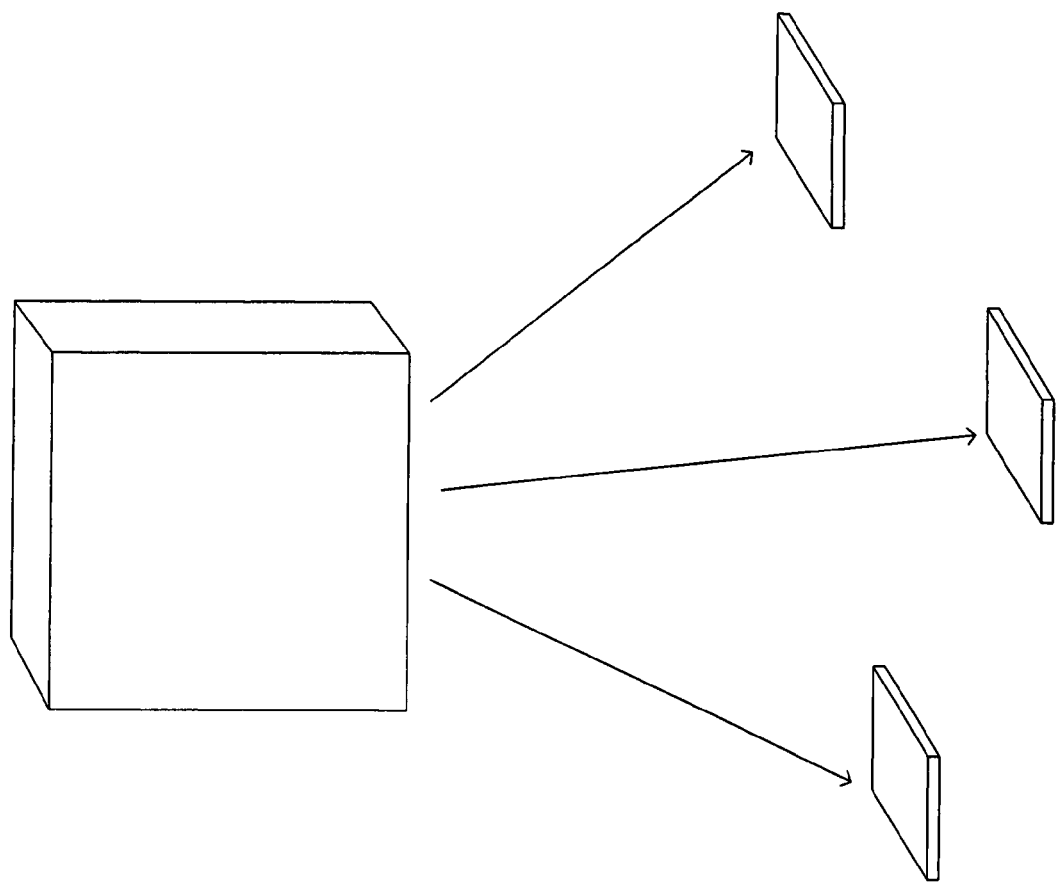

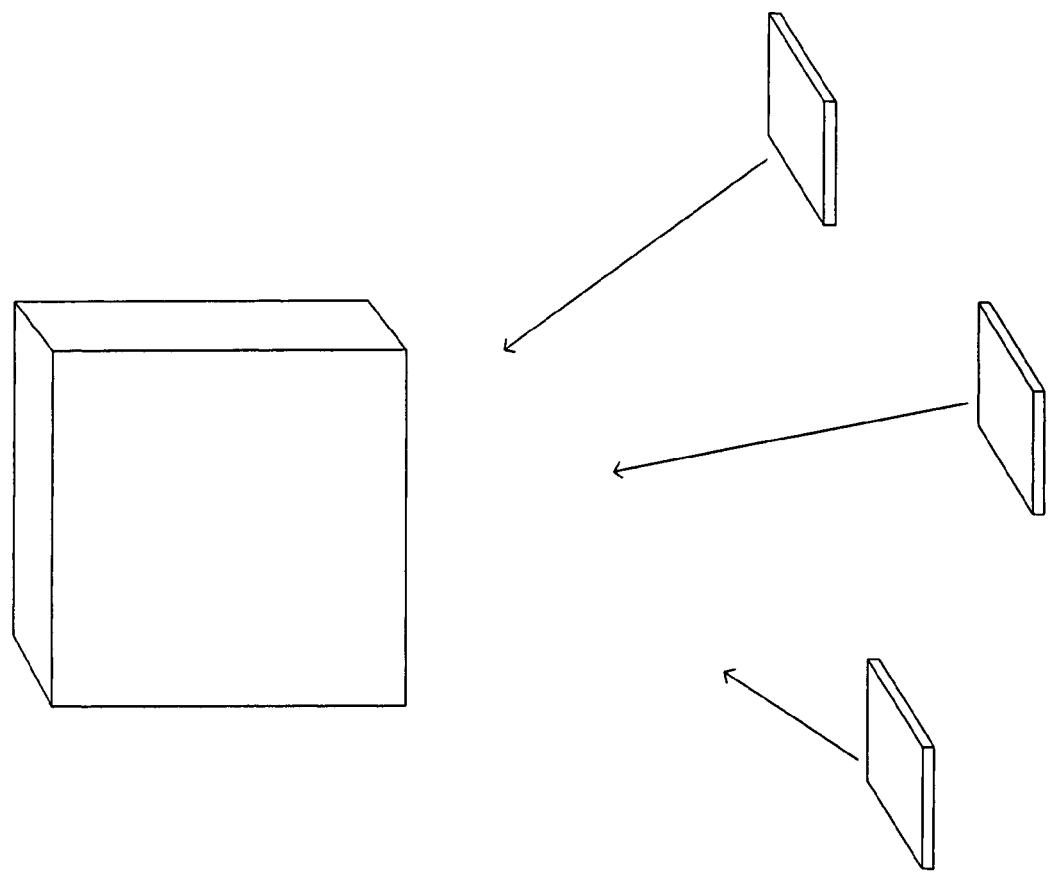

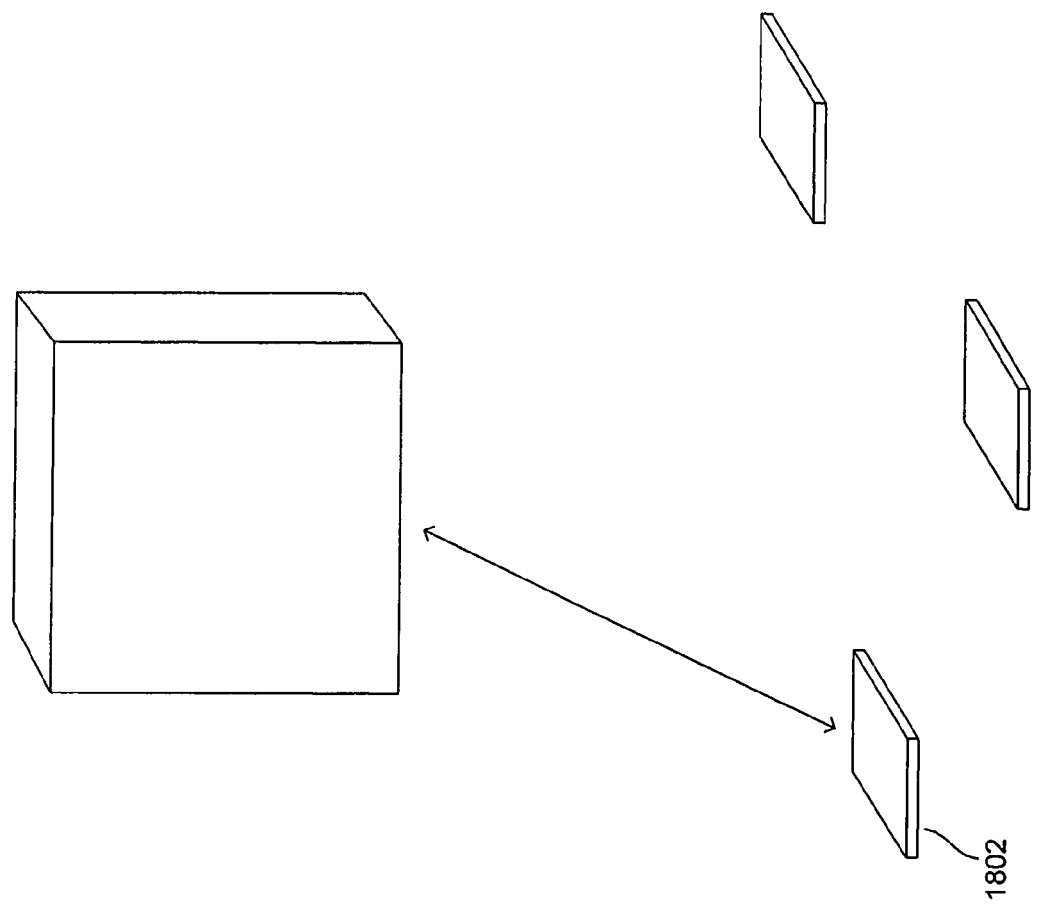

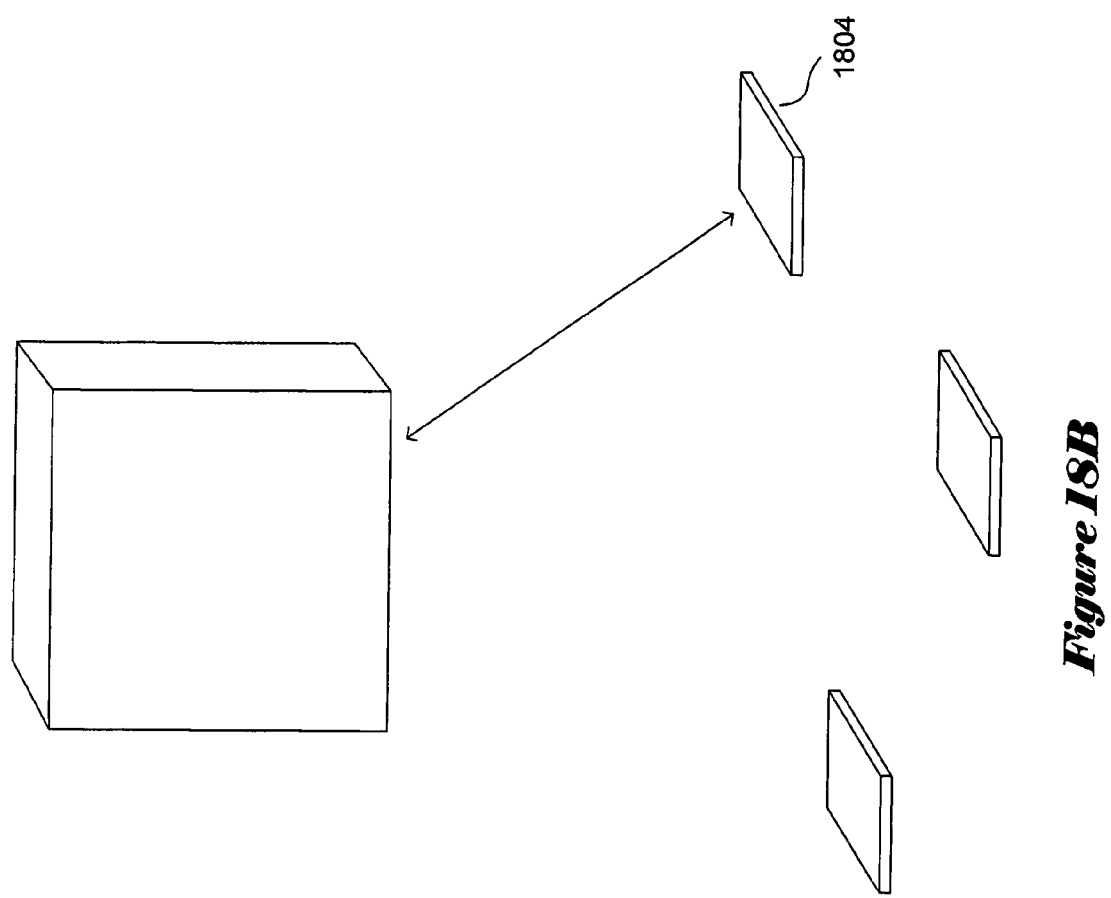

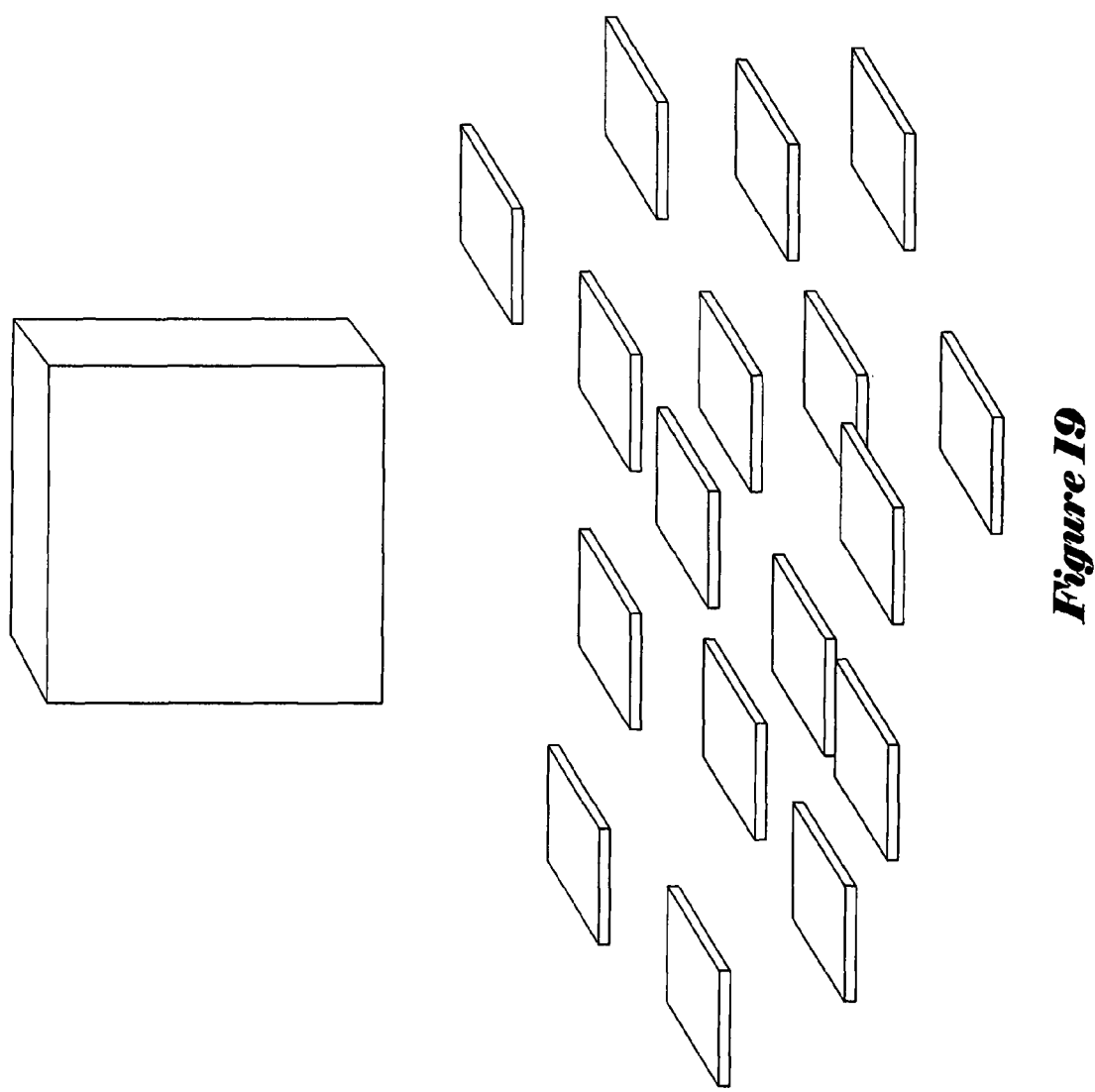

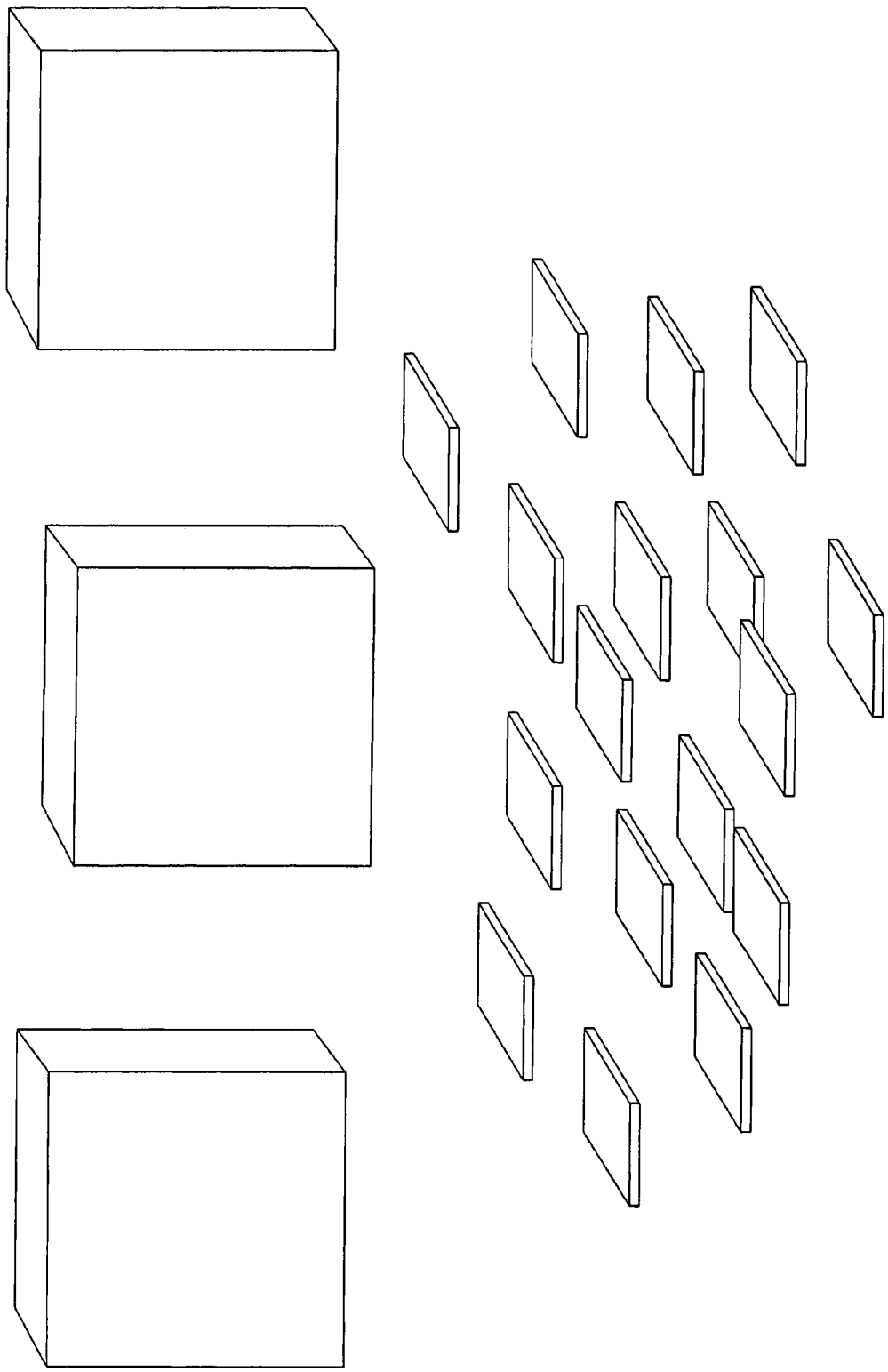

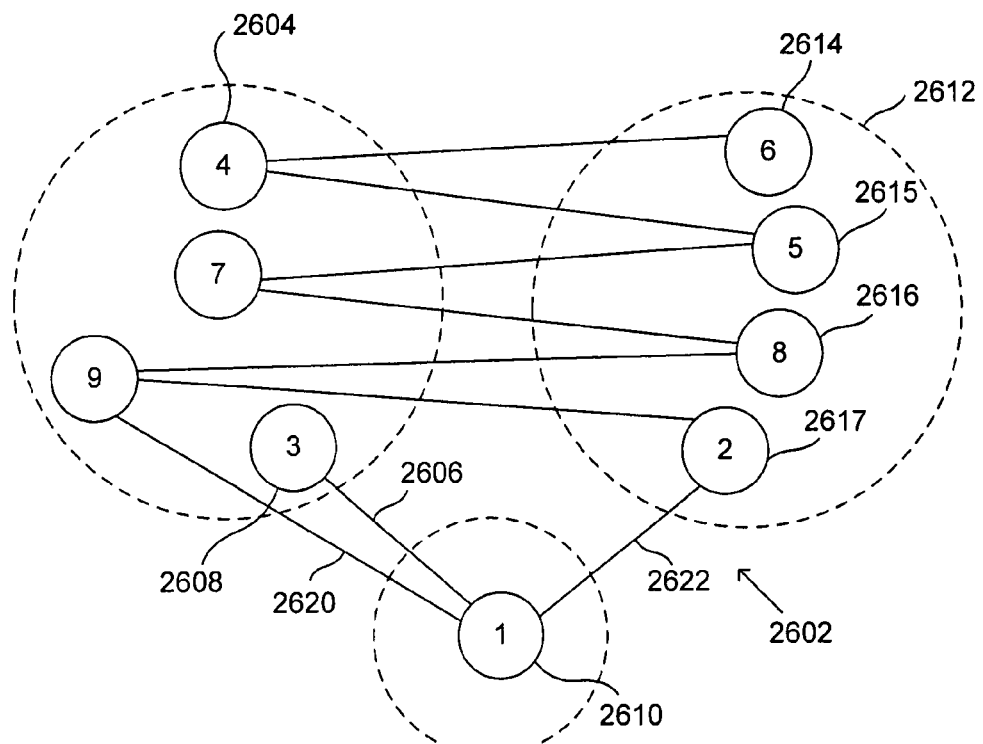
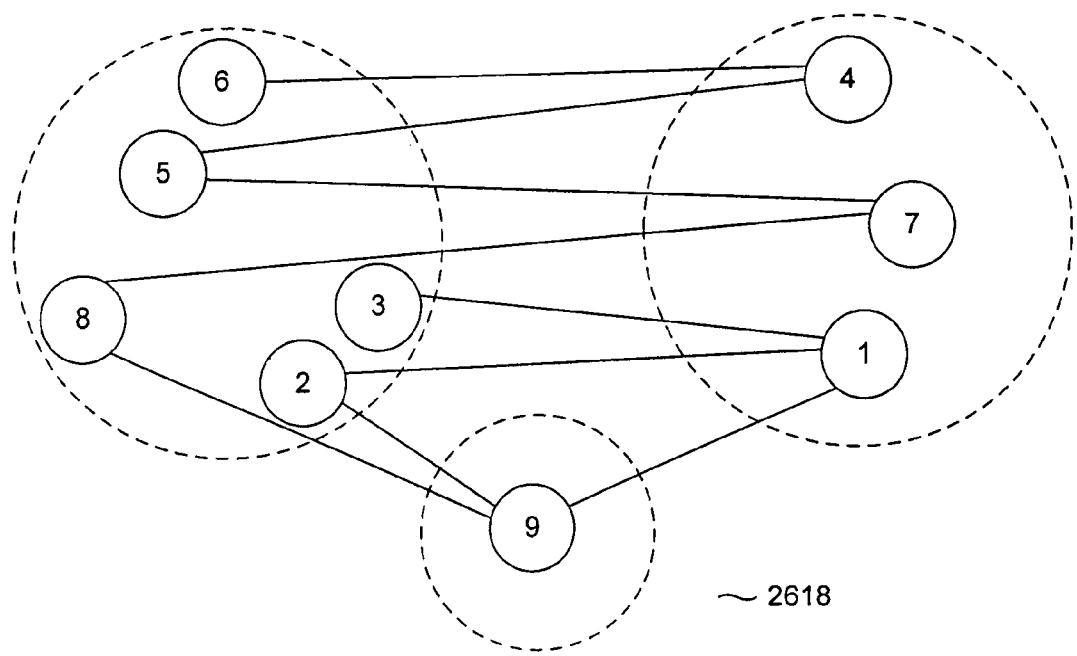
Figure 26

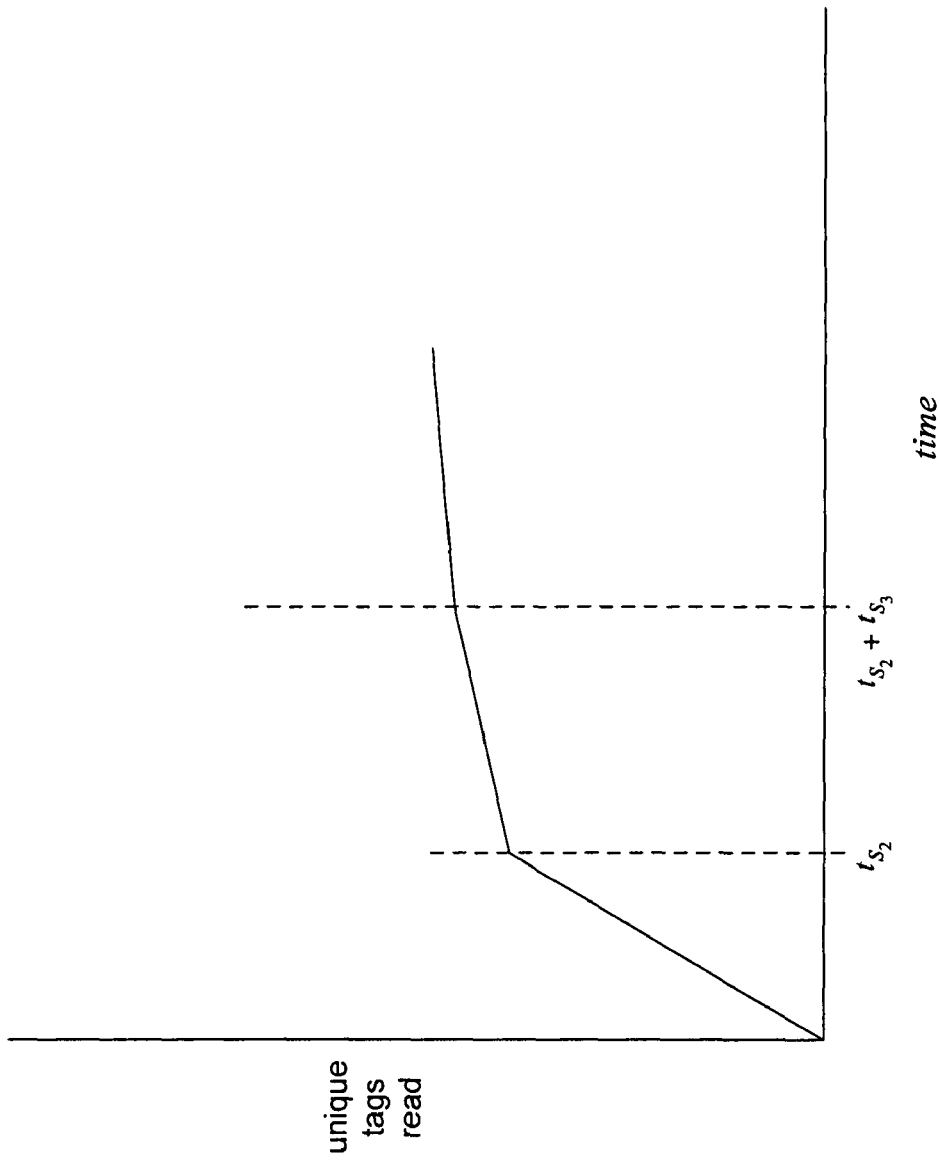

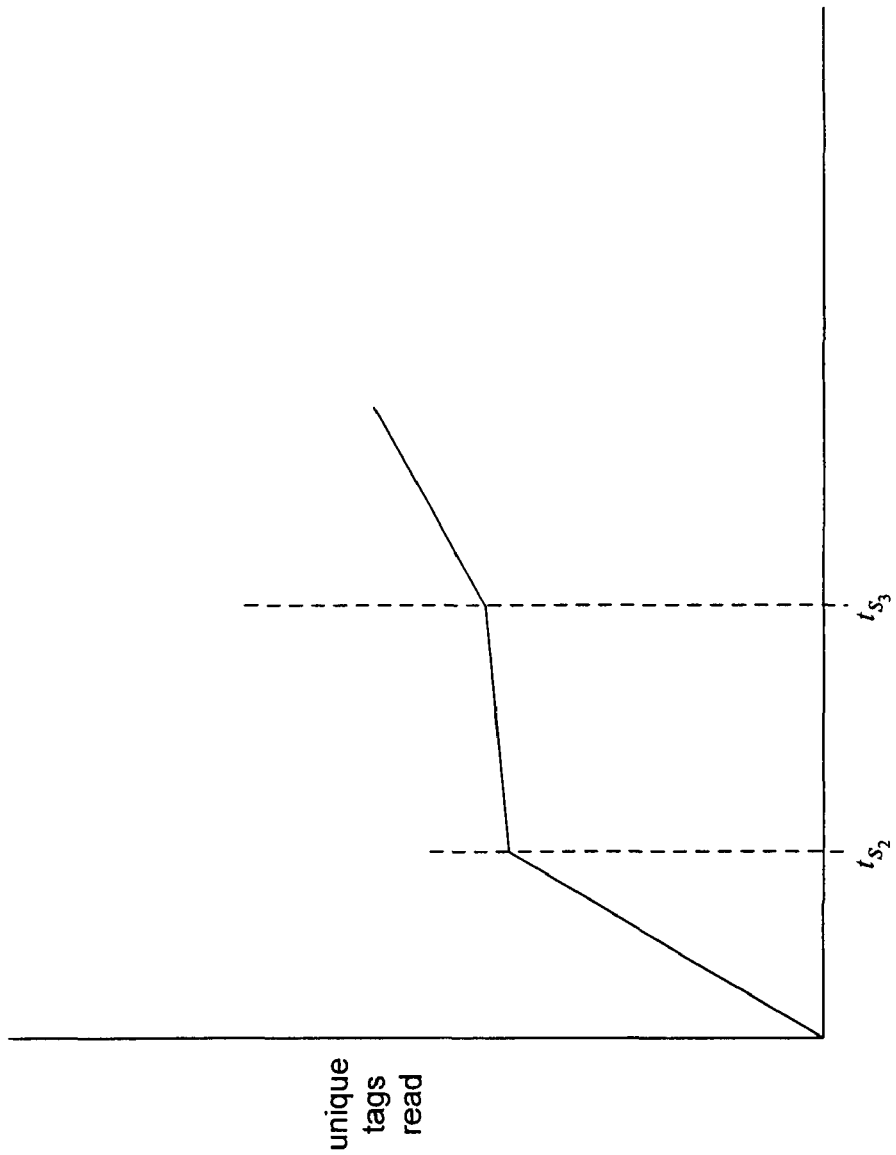

CLUSTERING METHODS FOR RADIO-FREQUENCY-IDENTIFIER NETWORKS

CROSS-REFERENCE TO RELATED APPLICATION

This application is a continuation-in-part of application Ser. No. 11/635,738, filed Dec. 6, 2006.

TECHNICAL FIELD

Methods and systems of the present invention are related to analysis and configuration of multi-radio-frequency-identification-tag reader networks and, in particular, to methods and systems for determining optimal or near-optimal subsets of the multi-radio-frequency-identification-tag readers in a multi-radio-frequency-identification-tag reader network.

BACKGROUND OF THE INVENTION

A large research and development effort has been directed to radio frequency identification ("RFID") technologies during the past ten years. As a result of these efforts, and as a result of their utility and economy, RFID tags and RFID-tag readers have found widespread, commercial application in a variety of disparate fields, from identification of pets to inventory management and inventory control. As discussed in the following sections, techniques have been developed to allow an RFID reader to interrogate, or read the contents of, multiple RFID tags within the RFID-tag reader's physical range of interrogation, or field. Despite advances in this area, however, the efficiency of an RFID-tag reader may be, in certain applications, significantly less than a desirable or needed efficiency, and significantly less than the RFID-tag reader's theoretical maximum efficiency under optimal conditions. Less research and development effort has been devoted to reading of RFID tags by multiple, interfering RFID-tag readers. In many applications, mutually interfering RFID-tag readers severely constrain, or even completely prohibit, effective interrogation of RFID tags by the mutually interfering RFID-tag readers, leading to low efficiency of multi-RFID-tag-reader networks that include mutually interfering RFID-tag readers. For these reasons, RFID researchers and developers, as well as manufacturers, vendors, and users of RFID tags and RFID-tag systems, have recognized the need for methods for improving the efficiencies of multi-RFID-tag-reader networks that include two or more mutually interfering RFID-tag readers.

SUMMARY OF THE INVENTION

Methods and systems of the present invention are directed to clustering RFID-tag readers of a multi-RFID-tag-reader network in order to obtain a set of RFID-tag readers with high probability of detecting an event, but with low probability of collisions and with an acceptable cost. The cost may be determined by any of numerous cost functions of the RFID-tag readers in the set of RFID-tag readers, and may represent a cost in power, long-term reliability, and other such metrics that may be applied to an RFID-tag network.

BRIEF DESCRIPTION OF THE DRAWINGS

FIG. 14 illustrates a slightly more complex interaction in which a single RFID-tag reader interrogates multiple RFID tags within its range.
FIG. 15 shows the RFID-tag reader transmitting an RF carrier signal that is received by the multiple RFID tags within its range.
FIG. 16 shows the multiple RFID tags attempting to respond simultaneously to the detected RF carrier signal.
FIGS. 18A-C illustrate one time-based multiplexing technique that employs a collision-avoidance technique.
FIG. 19 shows a number of different RFID tags within the field of, and properly oriented with respect to, a single RFID-tag reader.
FIG. 20 shows a number of different RFID tags within the field of, and properly oriented with respect to, three different RFID-tag readers.
FIG. 26 illustrates two different collision-graph representations of the multi-RFID-tag-reader network shown in FIGS. 21 and 24-25.
FIG. 28 illustrates a first period in a cycle of power-on/power-off operations of the interrogation strategy in which RFID-tag readers of an independent subgroup are powered-on.
FIG. 29 illustrates a second period in a cycle of power-on/power-off operations of an interrogation strategy in which RFID-tag readers of a second independent subgroup are powered-on.

DETAILED DESCRIPTION OF THE INVENTION

Methods and systems of the present invention are directed to identifying optimal or near-optimal subsets of the RFID-tag-readers in a multi-RFID-tag-reader network. In a first subsection, various aspects of graph theory are provided as a foundation for descriptions of embodiments of the present invention. In a second subsection, an exemplary multi-RFID-tag-reader network is described, followed by descriptions of methods related to partitioning multi-RFID-tag-reader networks for collision-avoidance purposes. In a third subsection, method embodiments of the present invention are discussed, with reference to a pseudocode implementation and a flow-control diagram.

Brief Overview of Relevant Aspects of Graph Theory

Figure 1:
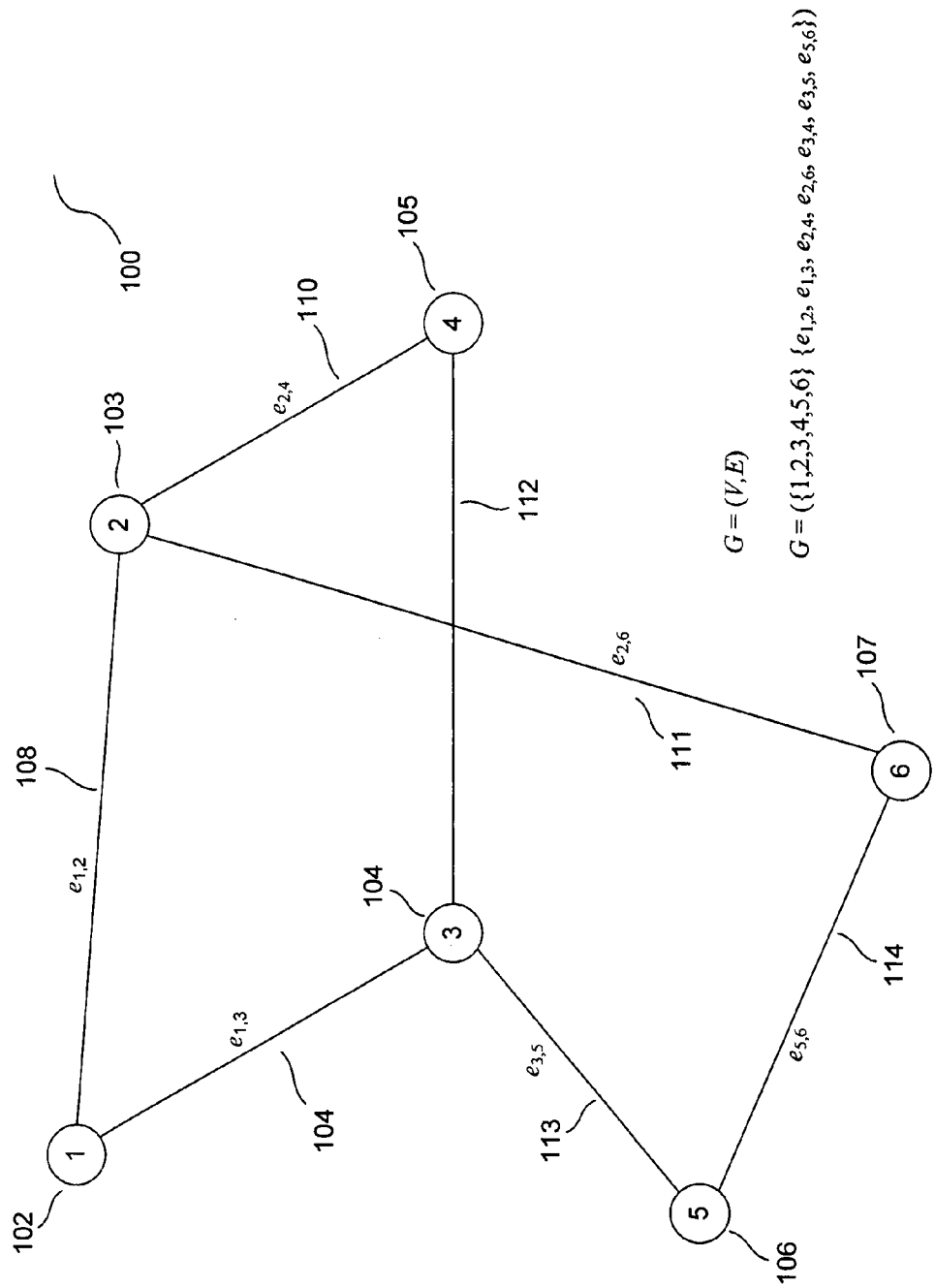
FIG. 1 illustrates a simple, undirected graph G.

FIG. 1 illustrates a simple, undirected graph G. The graph G 100 comprises includes nodes 102-107 that together compose a set of nodes V and edges 108-114 that together compose a set of edges E. In the graph G shown in FIG. 1, the nodes, or vertices, are shown as circles with numerical labels 1-6, and the edges are each labeled as $e_{x,y}$ where x and y are the numerical labels of the vertices directly connected by the edge. Mathematically, a graph G is represented as:

$$G = (V, E)$$

where V is the set of vertices and E is the set of edges. For the graph shown in FIG. 1, the graph can be explicitly defined as:

$$G = (\{1,2,3,4,5,6\}, \{e_{1,2}, e_{1,3}, e_{2,4}, e_{2,6}, e_{3,4}, e_{3,5}, e_{5,6}\})$$

Figure 2:
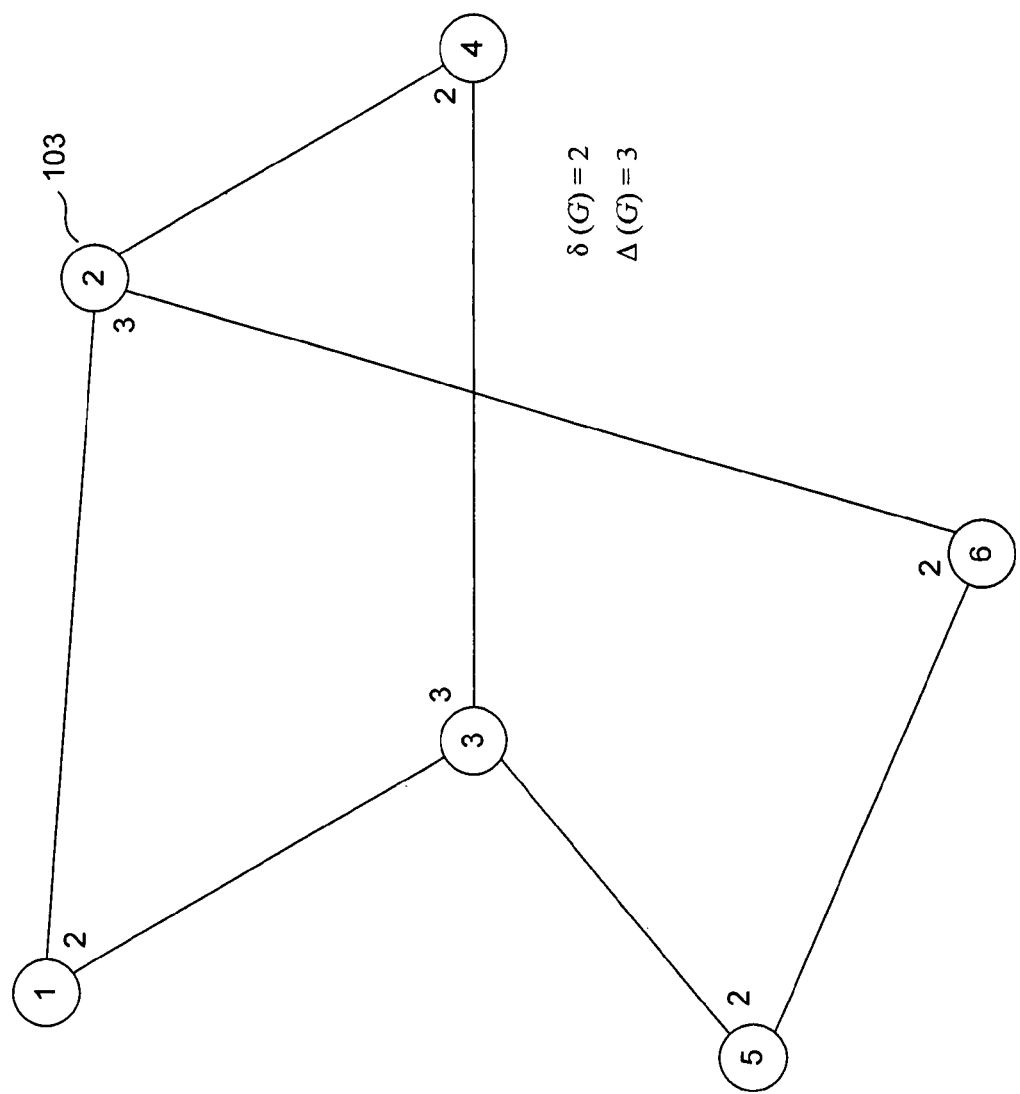
FIGS. 2-4 illustrate various characteristics of graphs using the graph G shown in FIG. 1.
Figure 3:
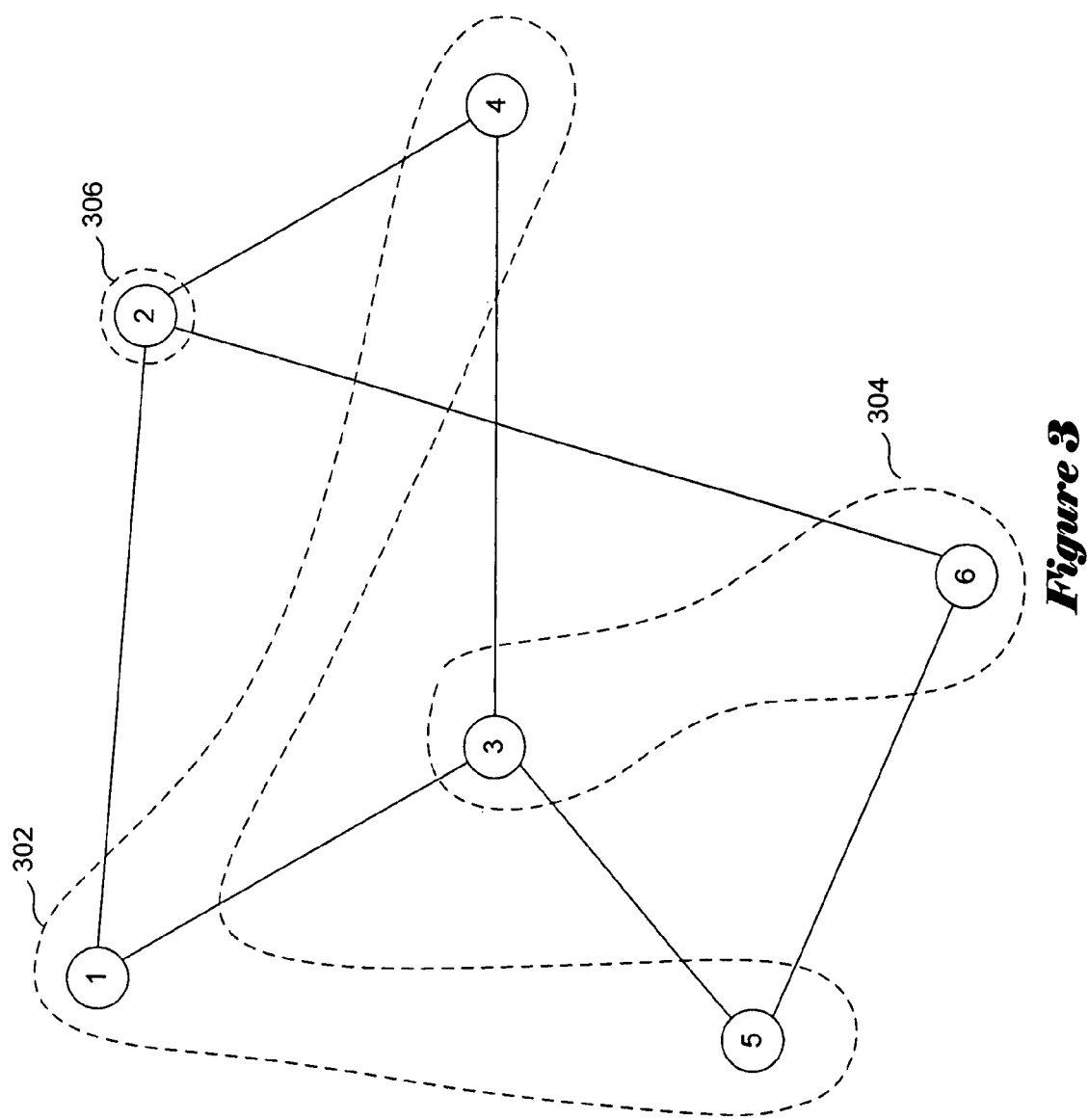
Figure 4:
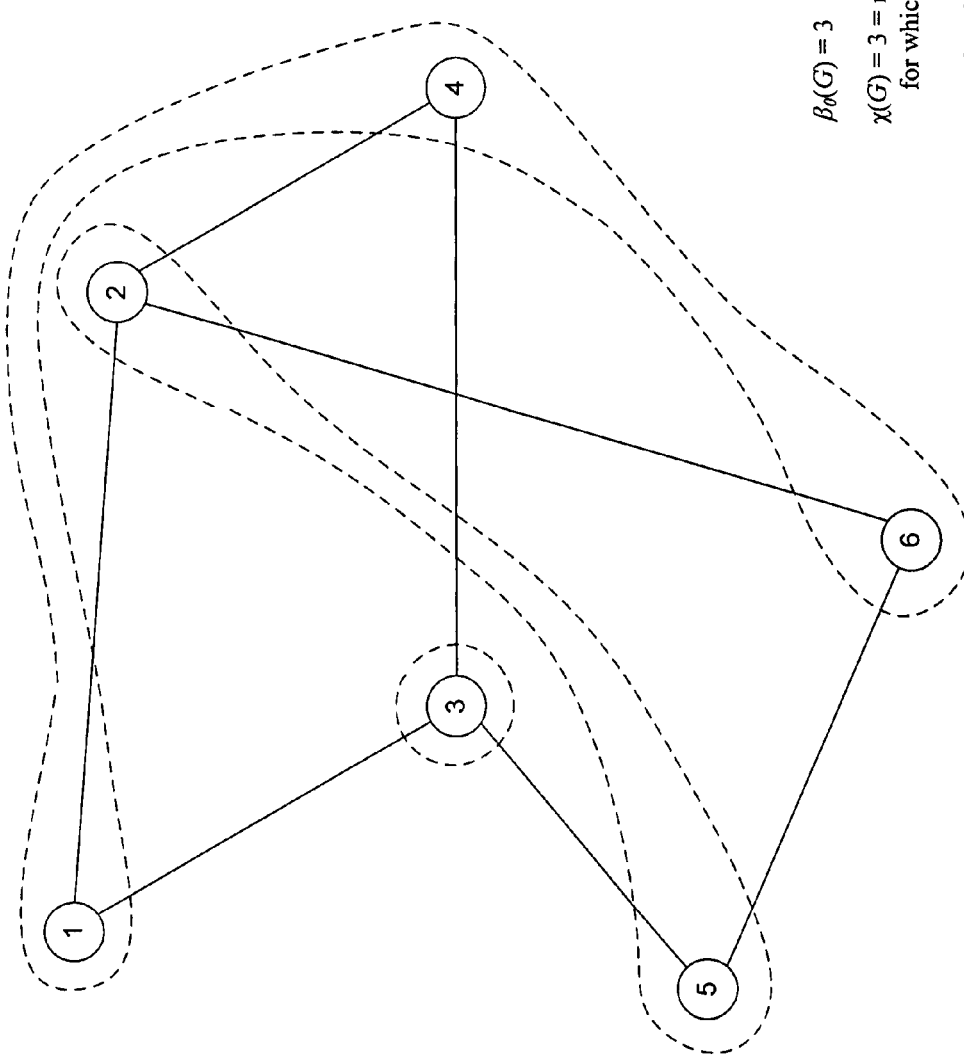

FIGS. 2-4 illustrate various characteristics of graphs using the graph G shown in FIG. 1. The degree of a vertex is the number of edges emanating from the vertex. In FIG. 2, each vertex of the graph G is labeled with the degree of the vertex. For example, the degree of vertex 2 103 is three. The minimum degree of any of the vertices in graph G, denoted as $\delta(G)$, is two, and the maximum degree of any of the vertices in G, designated $\Delta(G)$, is three.

An independent subset of V is a subset of vertices of a graph, each of which is not connected to other vertices of the subset by an edge. FIG. 3 shows the vertices of the graph G grouped into three independent subsets, indicated in FIG. 3 by dashed lines. One independent subset 302 includes the vertices 1, 4, and 5. A second independent subset 304 includes the vertices 3 and 6, and a third independent subset of vertices 306 includes the single vertex 2. In general, the vertices of a graph may be partitioned into many different independent subsets. For example, FIG. 4 shows a different partitioning of the vertices of graph G into three independent subsets. The size of the largest independent subset of vertices in graph G, or, in other words, the cardinality of the largest independent subset of vertices in graph G, is denoted as $\beta_0(G)$. The maximum size of any independent subset of vertices in the graph G shown in FIGS. 1-4 is three. Adding another vertex, or node, to any independent subset of vertices of cardinality 3 in graph G produces a subset with at least two nodes connected by an edge.

A graph is referred to as k-partite when the vertices of the graph can be partitioned into k independent subsets of vertices. Graph G shown in FIGS. 1-4 can be trivially seen to be 6-partite, since each of the six vertices can be assigned to a different, independent subset of vertices each including a single vertex. Graph G is also 5-partite, 4-partite, and 3-partite, but the vertices of graph G cannot be partitioned into only two independent subsets of vertices, and is therefore not bipartite. The minimum k for which $$V = \bigcup_{i=1 \text{ to } k} V_i,$$

where each $V_i$ is an independent set of vertices of the set of vertices V of a graph, is referred to as the chromatic number of the graph, denoted, for graph G, $\chi(G)$. The chromatic number is the minimum number of colors that can be used to color the vertices of a graph so that no two vertices with the same color are joined by a single edge.

Figure 5:
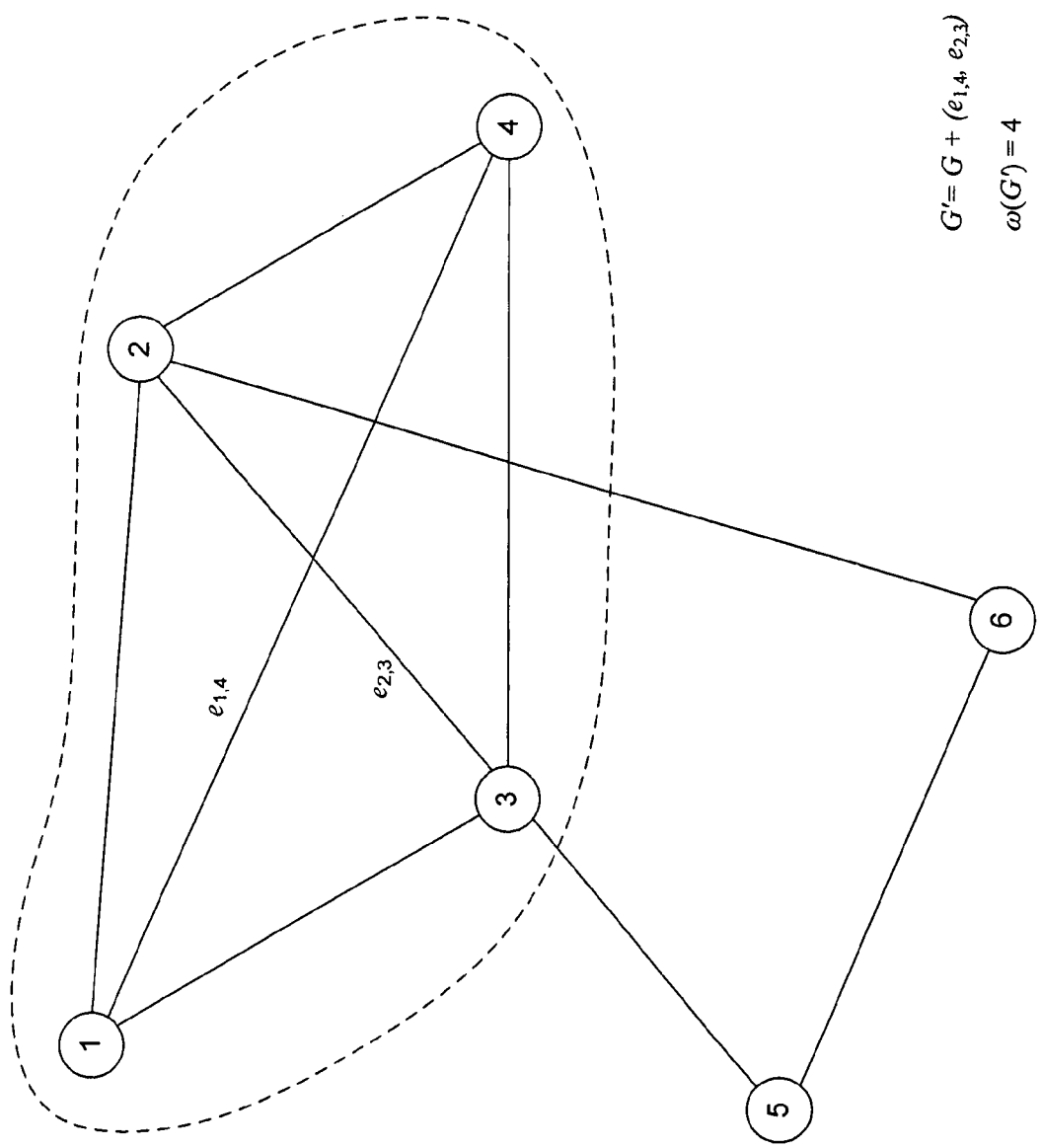
FIG. 5 shows a graph G' derived from the graph G shown in FIGS. 1-4 by addition of two new edges.

FIG. 5 shows a graph G' derived from the graph G shown in FIGS. 1-4 by addition of two new edges. Two edges $e_{1,4}$ and $e_{2,3}$ have been added to graph G to create graph G' in order to illustrate the concept of a clique. A clique is a subset of vertices within a graph that are fully interconnected by edges. In graph G' shown in FIG. 5, vertices 1, 2, 3, and 4 are fully connected, since there is an edge interconnecting each possible pair of vertices selected from the subset of vertices $\{1,2,3,4\}$. The clique number of a graph, denoted $\omega(G)$, is the cardinality of the largest clique in the graph. The cardinality of graph G' shown in FIG. 5, $\omega(G')$, is 4, since the above-described clique is the largest clique within graph G'.

Figure 6:
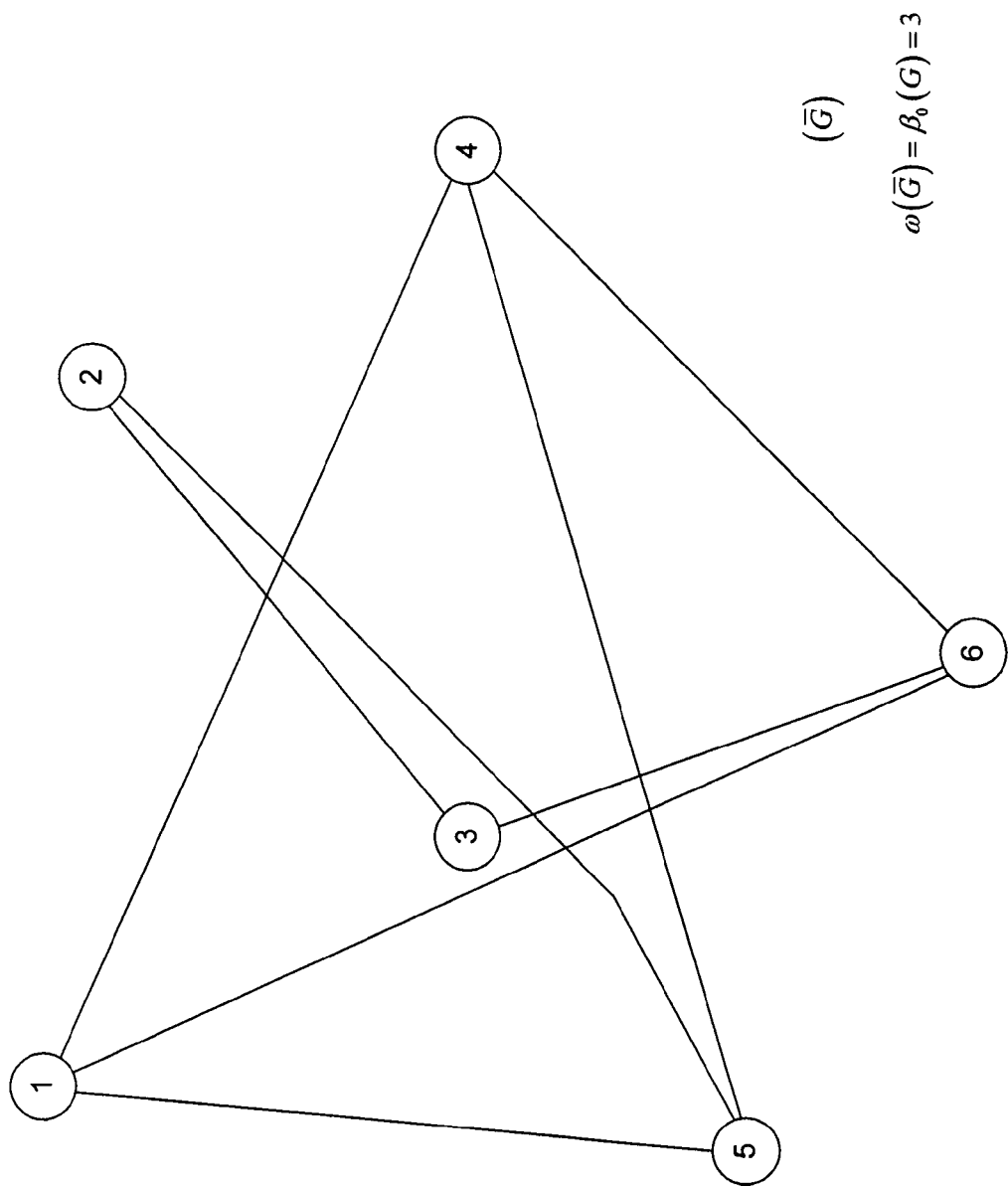
FIG. 6 shows the complementary graph of graph G.

FIG. 6 shows the complementary graph of graph G. The complementary graph of graph G is denoted $\overline{G}$. The complementary graph $\overline{G}$ has edges connecting vertices unconnected in G and lacks the edges present in graph G. The clique number of the complementary graph of graph G, $\omega(\overline{G})$, is equal to the cardinality of the maximum independent subset of graph G, $\beta_0(G)$. The cardinality of the largest independent subset of vertices in graph G s is three, and thus the clique number of the complement of graph G, $\overline{G}$, is also three. One clique with cardinality 3 consists of the set of vertices $\{1,4,6\}$.

Figure 7:
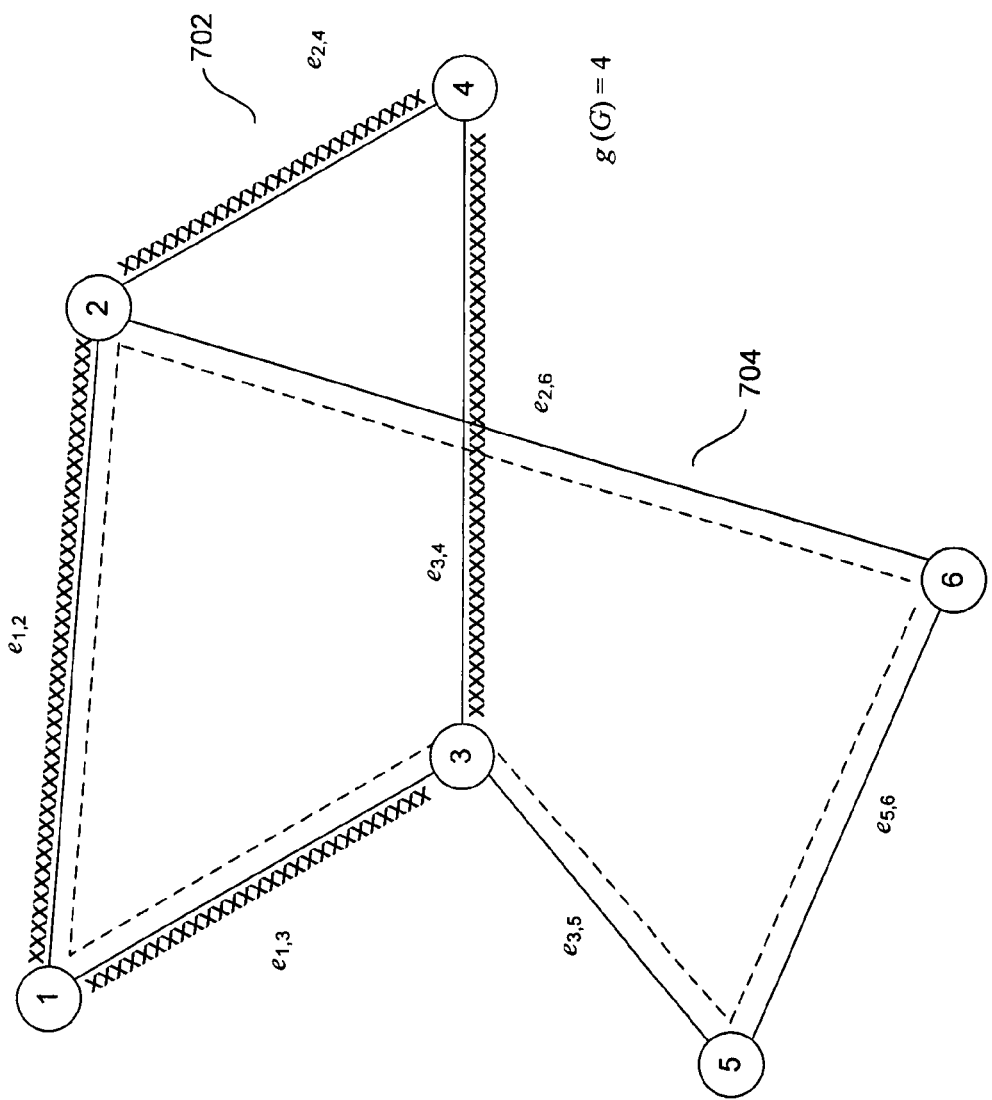
FIG. 7 illustrates two different cycles within the graph G shown in FIGS. 1-4.

Each edge of a pair of adjacent edges shares a common vertex. A cycle within a graph is a sequence of adjacent edges that begins and ends at one, particular vertex. FIG. 7 illustrates two different cycles within the graph G shown in FIGS. 1-4. The first cycle 702, denoted by a series of small "x" symbols along the edges of the cycle, comprises the set of edges $\{e_{1,2}, e_{2,4}, e_{3,4}, \text{and } e_{1,3}\}$. A second cycle 704, denoted by a series of small "-" symbols along the edges of the cycle, comprises the set of edges $\{e_{1,2}, e_{2,6}, e_{5,6}, e_{3,5}, \text{and } e_{1,3}\}$. A cycle of three edges is referred to as a "triangle." The girth of a graph, denoted as $g(G)$ for graph G, is the length, in edges, of the shortest cycle within the graph. The girth of graph G shown in FIGS. 1-4 and 7 is four, since graph G has two cycles of length 5 and one cycle of length 4.

Figure 8:
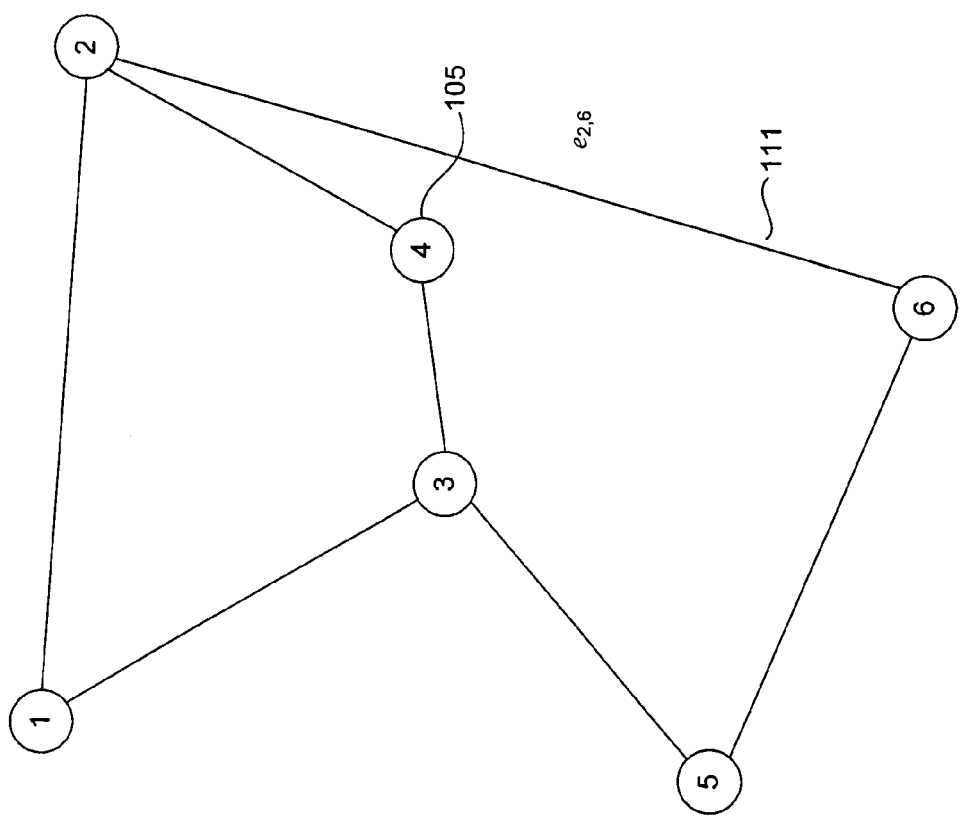
FIG. 8 shows an alternative illustration of the graph G shown in FIGS. 1-4 and 7.

A complete graph on p vertices is denoted by $K_p$, and the complete bipartite graph on independent sets of p and q vertices is denoted by $K_{p,q}$. FIG. 8 shows an alternative illustration of the graph G shown in FIGS. 1-4 and 7. In FIG. 8, vertex 4 105 has been moved leftward to the left-hand side of edge $e_{2,6}$ 111. In the alternative representation shown in FIG. 8, no pair of edges crosses over one another. A graph that can be drawn so that no pair of edges crosses over one another, such as graph G, is referred to as a planar graph. A graph can be colored by assigning one of a number of colors, or values, to each node within the graph. A graph is perfectly colored by n colors when, after assigning colors to each vertex in the graph, no single edge connects two vertices having the same color. A graph that is perfectly colored by n vertices is n-partite. The term "edge contraction" refers to combining two adjacent nodes into a single node, and removing the edge that originally connected the two combined nodes.

A few of the many graph theorems are next provided as a foundation for subsequent descriptions of method and system embodiments of the present invention:

Theorem 1. If $\Delta(G) \geq 2$, then $\chi(G) = \Delta G$ unless $\Delta(G)=2$ and $G$ contains a cycle of odd length; or (1)

$\Delta(G)>2$ and $G$ contains a clique of size $\Delta(G)+1$. (2)

Theorem 2. A graph is bipartite if and only if it has no cycles of odd length.

Theorem 3. For any positive integers h and k, there exists a graph with $g(G) \geq h$ and $\chi(G) \geq k$.

Theorem 4. A finite graph G is planar if and only if it has no subgraph that is edge-contractable to $K_5$ or $K_{3,3}$.

Theorem 5. Every planar graph can be perfectly colored with 4 colors. Equivalently, $\chi(G) \leq 4$ for every planar graph.

Theorem 6. $\chi(G)=3$ for every planar graph without four triangles.

Theorem 7. Consider the function f from graphs to integers such that f(G) is the maximum number of edges among all the bipartite subgraphs of G. Then $$f(G) > \frac{|E|}{2}.$$

Theorem 8. Consider the function h from integers to integers such that h(e) is the largest integer having the property that every graph with e edges has a bipartite subgraph with at least h(e) edges. Then $$h(e) \geq \frac{e}{2} + \frac{-1 + \sqrt{8e+1}}{8}$$

Theorem 9. A triangle-free graph of n vertices and e edges can be made bipartite by removing at most edges.

$$\text{Min}\left\{\frac{e}{2} - \frac{(2e(2e^2 - n^3))}{n^2(n^2 - 2e)}, e - \frac{4e^2}{n^2}\right\}$$

Theorem 10. Every graph has a bipartite subgraph on half of its vertices.

Theorem 11. Consider the function f from graphs to integers such that f(G) is the maximum number of edges among all of the bipartite subgraphs of G. If G is a triangle-free graph with e edges on n vertices with degrees $\{d_i\}_{i=1, \ldots, n}$, then $$f(G) > \frac{e}{2} + \frac{1}{8\sqrt{2}} \sum_{i=1}^{n} \sqrt{d_i}$$

RFID Tags and RFID-Tag Readers

Figure 9:
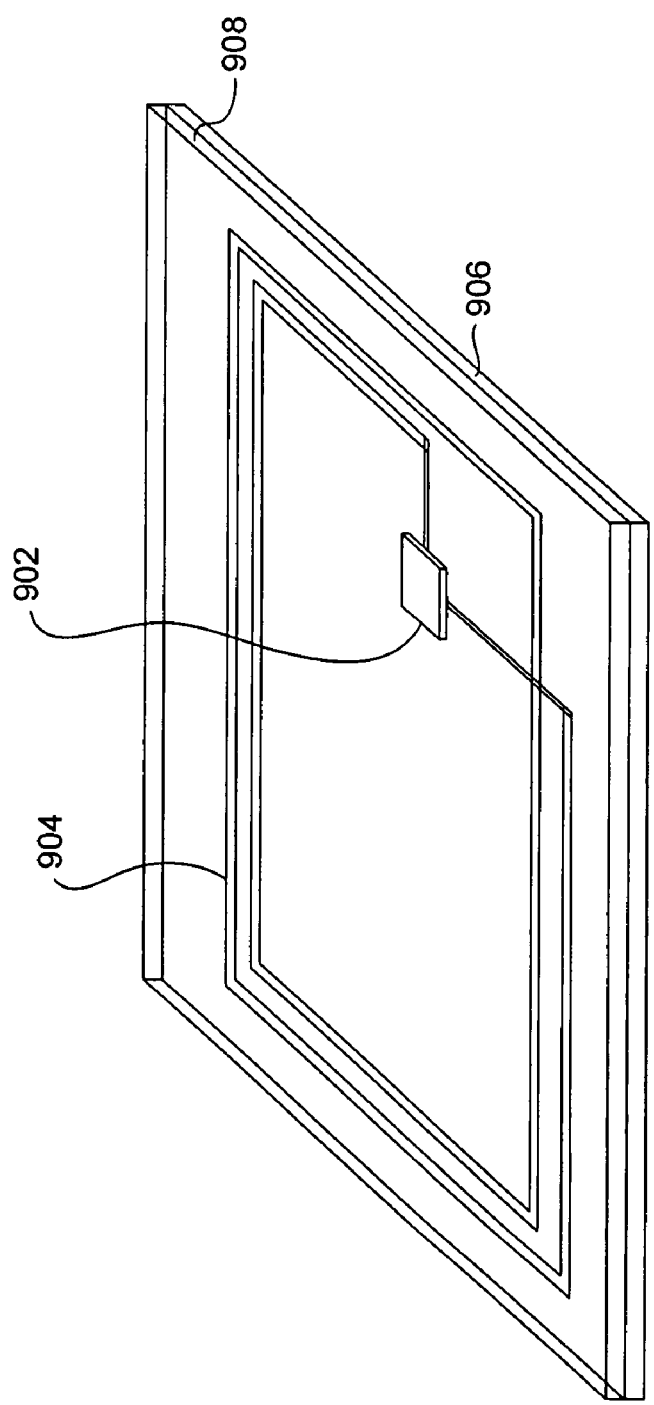
FIG. 9 illustrates the basic components of a passive RFID tag.

There are many different types of RFID tags and RFID readers. FIG. 9 illustrates the basic components of a passive RFID tag. A passive RFID tag may include an integrated circuit ("IC") 902, or chip, and an antenna 904, both affixed to a substrate 906 and covered by a film or coating 908. The IC includes logic circuitry, power-harvesting circuitry, and memory, and the antenna 904 receives an RF carrier signal from an RFID-tag reader that is used by the passive RFID tag for power, for an internal clock signal, and as a communications medium for returning data stored in the RFID tag to the RFID-tag reader. Passive RFID tags do not contain batteries, capacitors, or other stored energy sources, but instead harvest all the power needed to power the IC from the RF carrier signal. Semi-passive RFID tags include batteries to power the IC, but use the RF carrier signal from an RFID-tag reader for transmission of data. Active RFID tags include batteries and transmitters for transmitting data back to RFID-tag readers.

Figure 10:
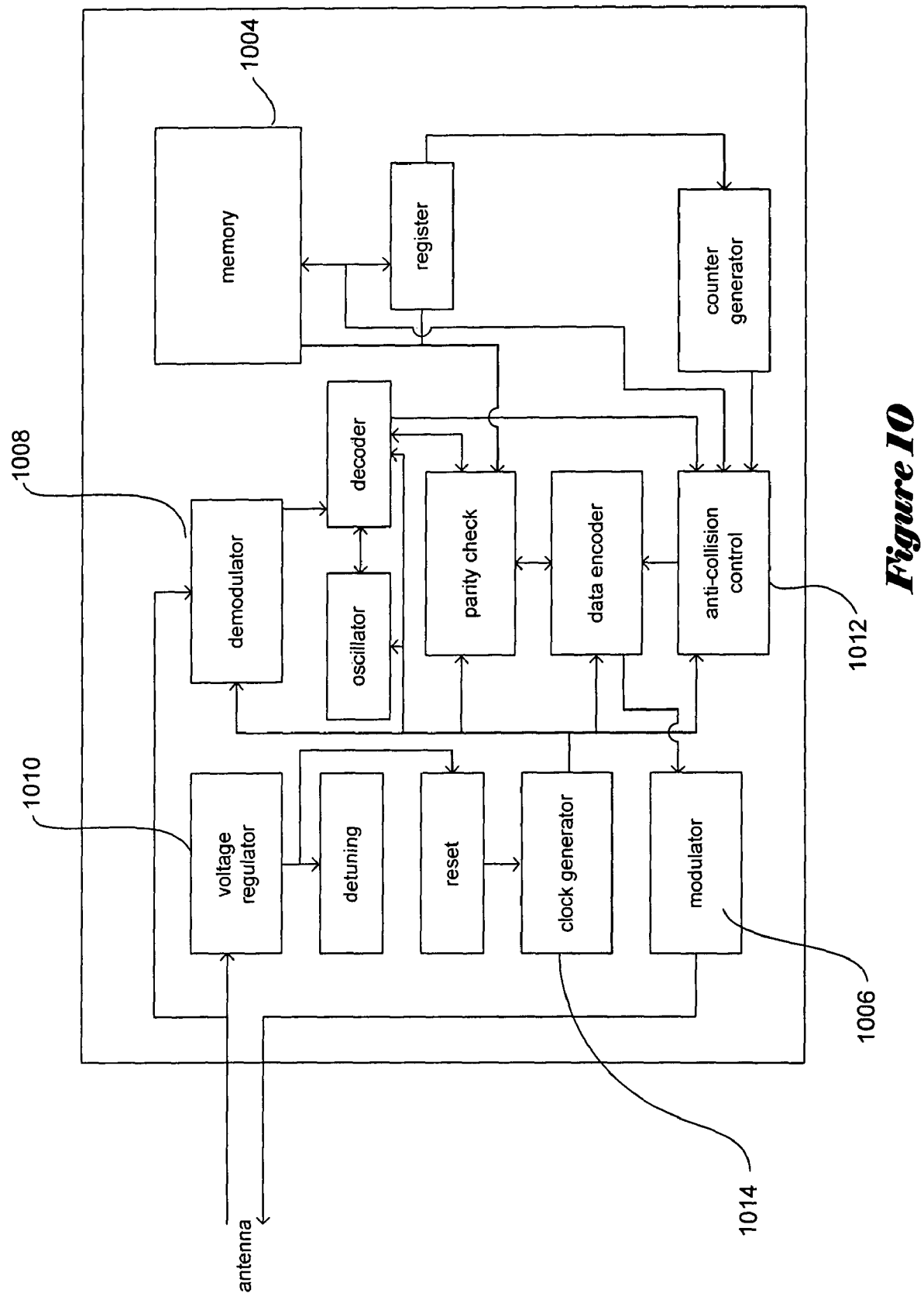
FIG. 10 illustrates the circuit modules fabricated within the IC of an exemplary passive-RFID-tag IC.

FIG. 10 illustrates the circuit modules fabricated within the IC of an exemplary passive-RFID-tag IC. The RFID-tag IC includes a very small memory 1004, such as an electronically erasable and programmable read-only memory ("EEPROM") capable of storing 96 bits, 1024 bits, or a greater number of bits of information. In general, the memory stores a digitally-encoded identifier, such as a product code and serial number, or other such information appropriate for the application in which the RFID tag is used. The RFID tag receives and transmits information by detecting modulation of, and generating modulation of, the received RF carrier signal. Thus, the IC includes both a modulator 1006 and demodulator, for transmitting and receiving information, respectively, on the RF carrier signal. As mentioned above, the RFID-tag IC is powered by energy extracted from the RF carrier signal, and therefore includes power extraction, regulation, and rectifying components, such as voltage regulator 1010. The RFID tag also includes circuitry that implements an anti-collision strategy 1012 that is discussed in greater detail below. In addition to receiving data and power from the RF carrier signal, the RFID tag also divides the RF carrier-signal frequency in order to generate a clock signal, by a clock-generator component 1014, that is used to control and synchronize the IC components. RFID-tag readers include complementary features and components for generating the RF carrier signal and for detecting modulation of the RF carrier signal in order to receive information from RFID tags within range of the RFID-tag reader.

Figure 11:
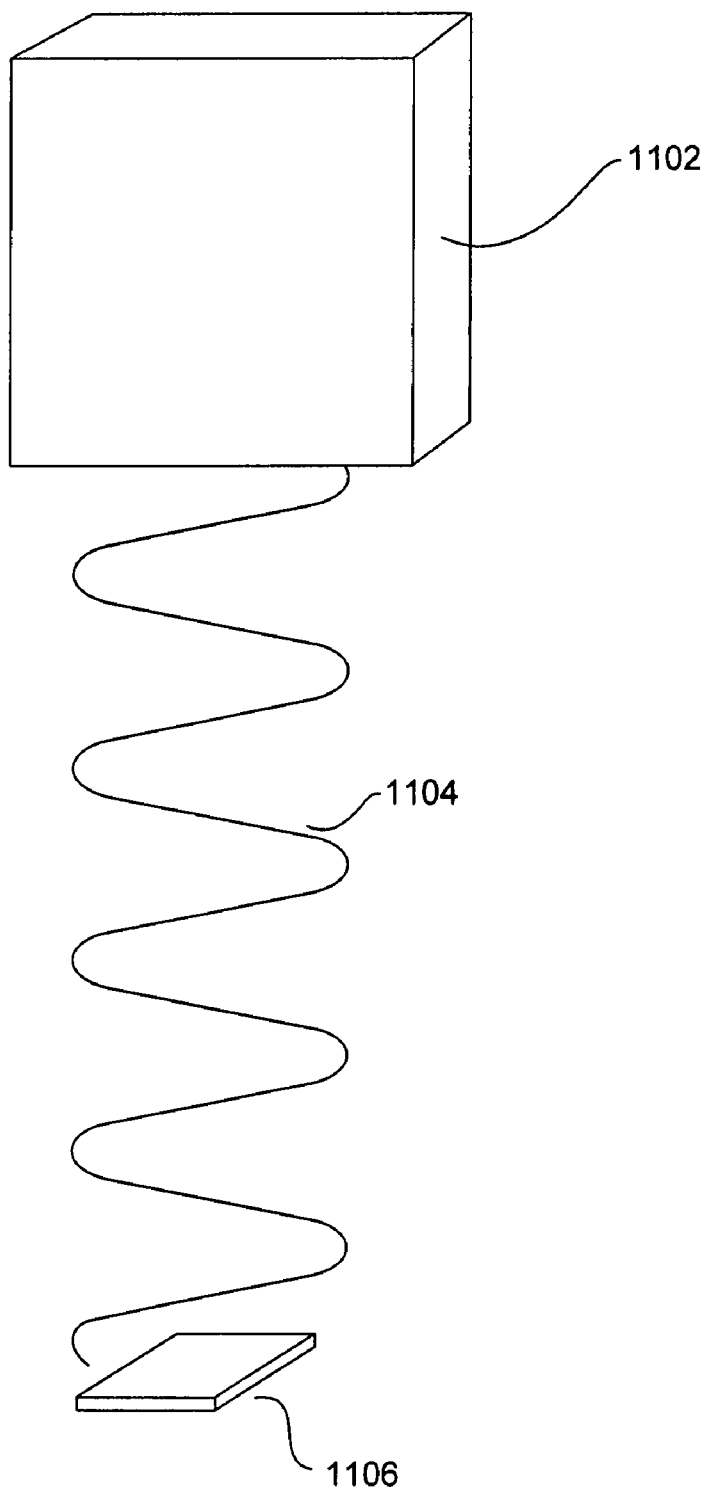
FIGS. 11-13C illustrate the basic operation of an RFID tag and RFID-tag reader.
Figure 12:
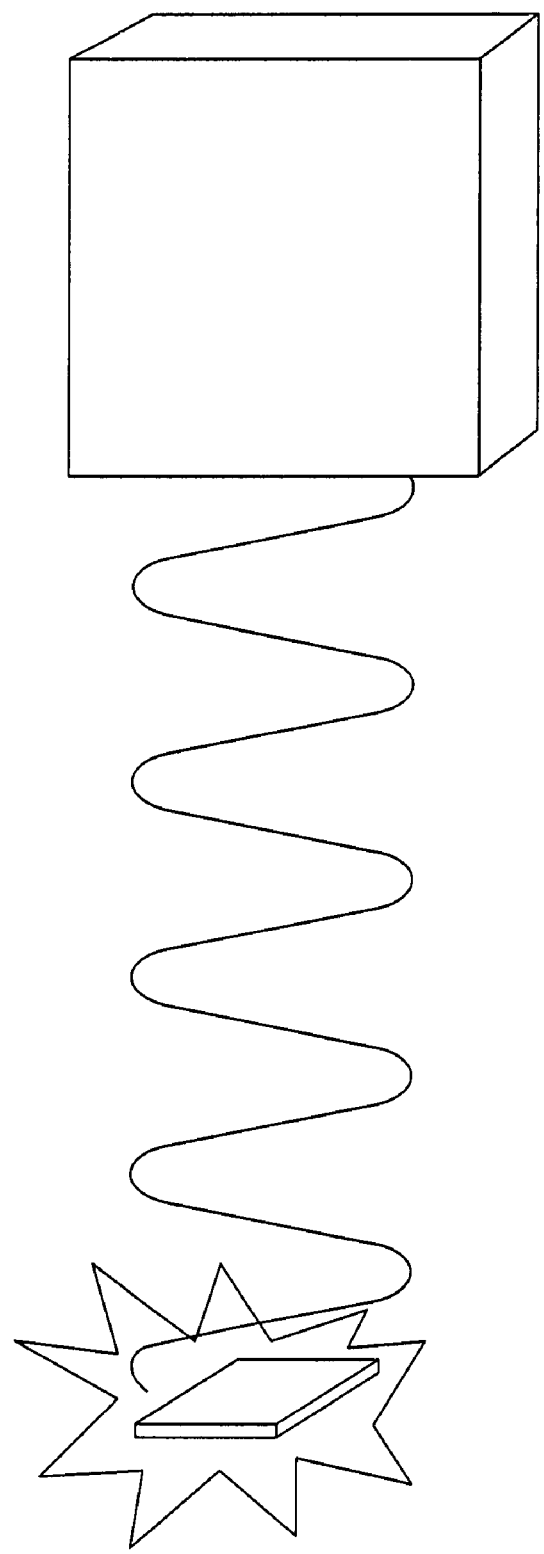

FIGS. 11-13C illustrate the basic operation of an RFID tag and RFID-tag reader. First, as shown in FIG. 11, an RFID-tag reader 1102 transmits an RF carrier signal 1104 to a surrounding region that includes an RFID tag 1106. When the RFID tag is close enough to the RFID-tag reader, or, in other words, within the field of the RFID-tag reader, and when the RFID tag is oriented so that the antenna of the RFID tag can extract sufficient energy from the RF carrier signal, as shown in FIG. 12, then the RFID tag generates sufficient current to operate the RFID-tag IC. Once energized, the RFID tag extracts information from the RFID-tag memory and transmits the information back to the RFID-tag reader by modulating the RF carrier signal generated by the RFID-tag reader.

Figure 13A:
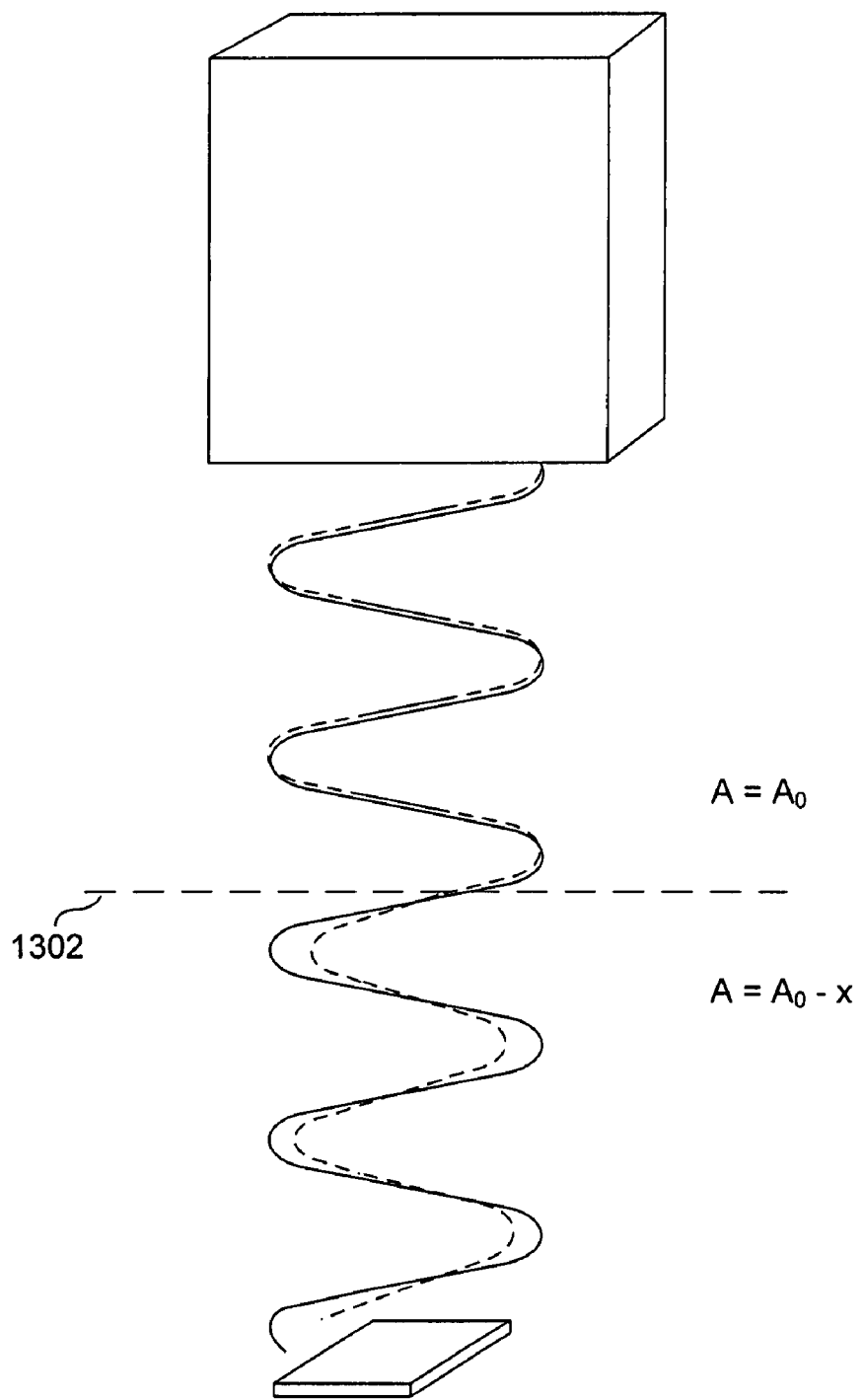
Figure 13B:
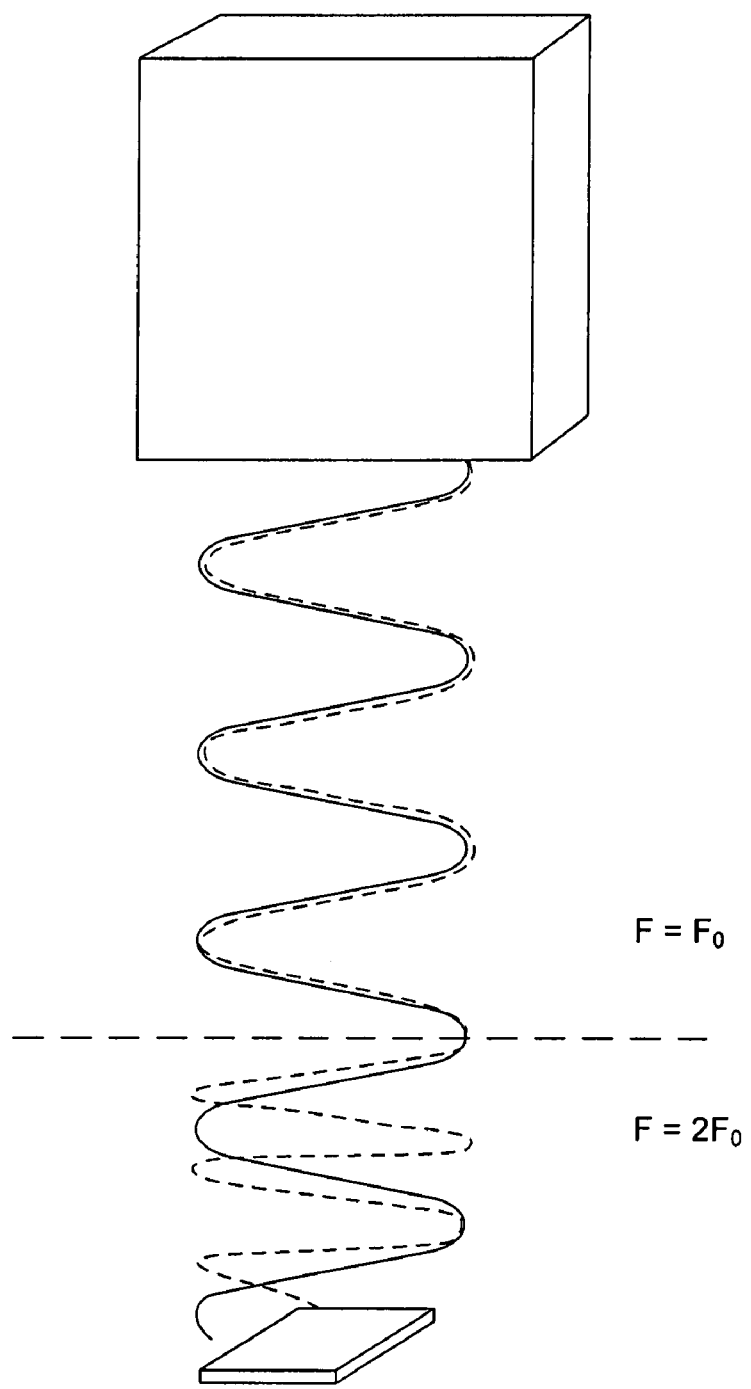
Figure 13C:
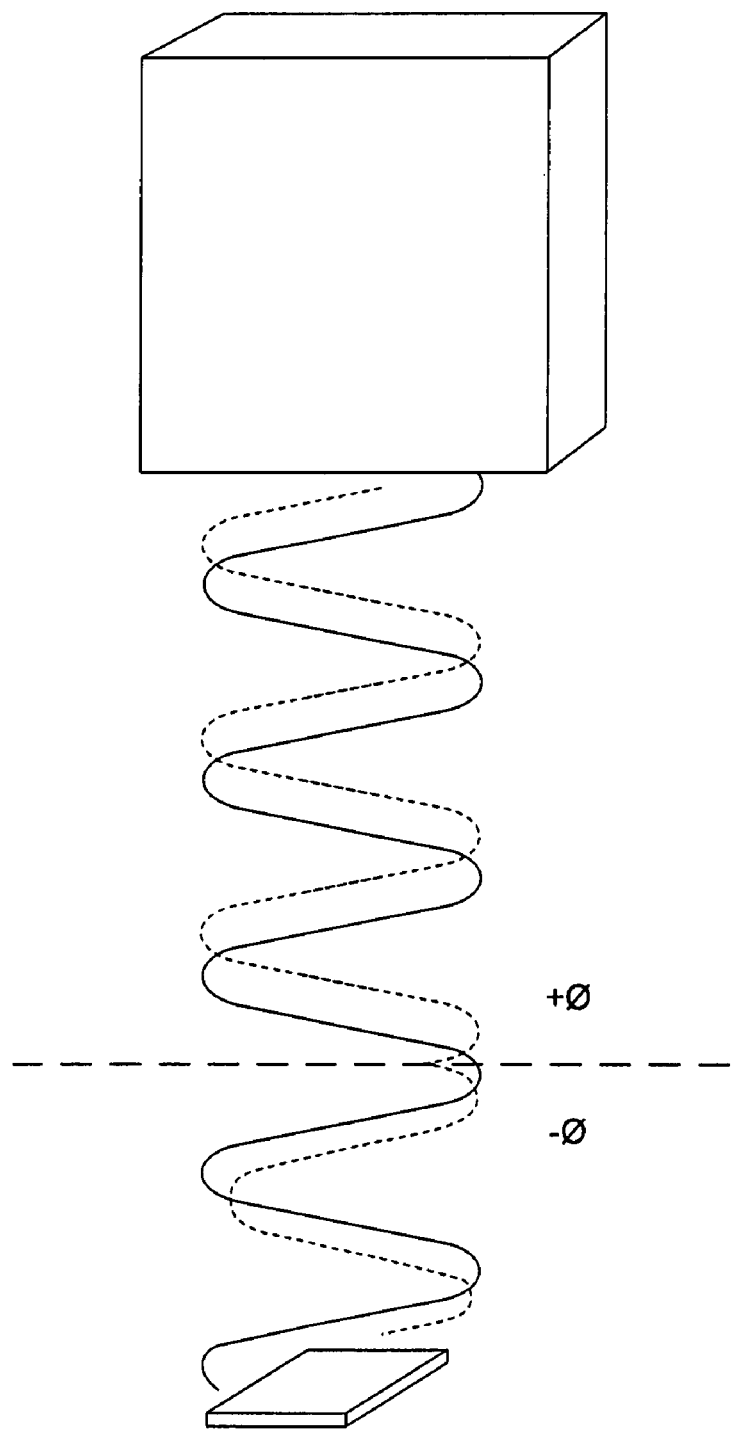

FIG. 13A-C illustrate three of various types of carrier-signal modulation employed by RFID tags. In a first modulation technique, illustrated in FIG. 13A, the RFID tag modulates the amplitude of the RF carrier signal, at discrete intervals of time, to generate a binary-encoded RF-carrier-signal modulation that can be detected and read by the RFID-tag reader. For example, unmodulated RF-carrier signal, above the dashed line 1302 in FIG. 13A, may correspond to a binary "0" value, while modulated RF-carrier signal, below the dashed line 1302 in FIG. 13A, may correspond to a binary "1" value. The RFID tag can modulate the amplitude of the RF carrier signal by shunting the antenna to remove energy from the RF carrier signal. The RFID-tag reader detects the presence or absence of amplitude modification at discrete intervals of time, and translates the modulation into a digital, binary signal. As shown in FIG. 13B, the RFID tag may modulate the RF carrier signal by changing the frequency of the RF carrier signal, and as shown in FIG. 13C, the RFID tag may alternatively modulate the RF carrier signal by changing the phase of the RF carrier signal. A variety of different types of data encodings can be employed by RFID tags and RFID tag readers, including direct encodings, differential biphase encodings, Manchester encodings, and other encodings. When the RFID-tag reader successfully receives the digitally encoded data transmitted by the RFID tag, the RFID tag has been successfully read.

As mentioned above, RFID tags are employed to associate physical objects with digitally encoded information in a variety of different settings and applications. It is a common practice to inject tiny RFID tags into laboratory animals and pets to allow the laboratory animals and pets to be subsequently identified by reading digitally encoded animal identifications from the RFID tags. Many different types of products currently bear RFID tags to allow the products to be detected and monitored during shipment and to facilitate inventory control within distribution centers and retail establishments.

The simple interrogation sequence shown in FIGS. 11-13C, in which a single RFID-tag reader detects a single RFID tag within its environment, or range, represents probably the simplest RFID tag/RFID-tag reader interaction. FIG. 14 illustrates a slightly more complex interaction in which a single RFID-tag reader interrogates multiple RFID tags within its range. As shown in FIG. 14, three different RFID tags 1402-1404 are within the range, and properly oriented with respect to, a single RFID-tag reader 1406. When the RFID-tag reader sends out an RF carrier signal, as illustrated in FIG. 15, all three of the RFID tags within the range of, and properly oriented with respect to, the RFID-tag reader may attempt to respond to the detected RF carrier signal by modulating the RF carrier signal to transmit their stored information back to the RFID reader, as shown in FIG. 16. Unfortunately, when more than one RFID tag attempts to transmit information at a given point in time, the unsynchronized RFID-tag modulations of the RF carrier wave result in a garbled and undecipherable modulation-based signal that cannot be read by the RFID-tag reader.

Figure 17:
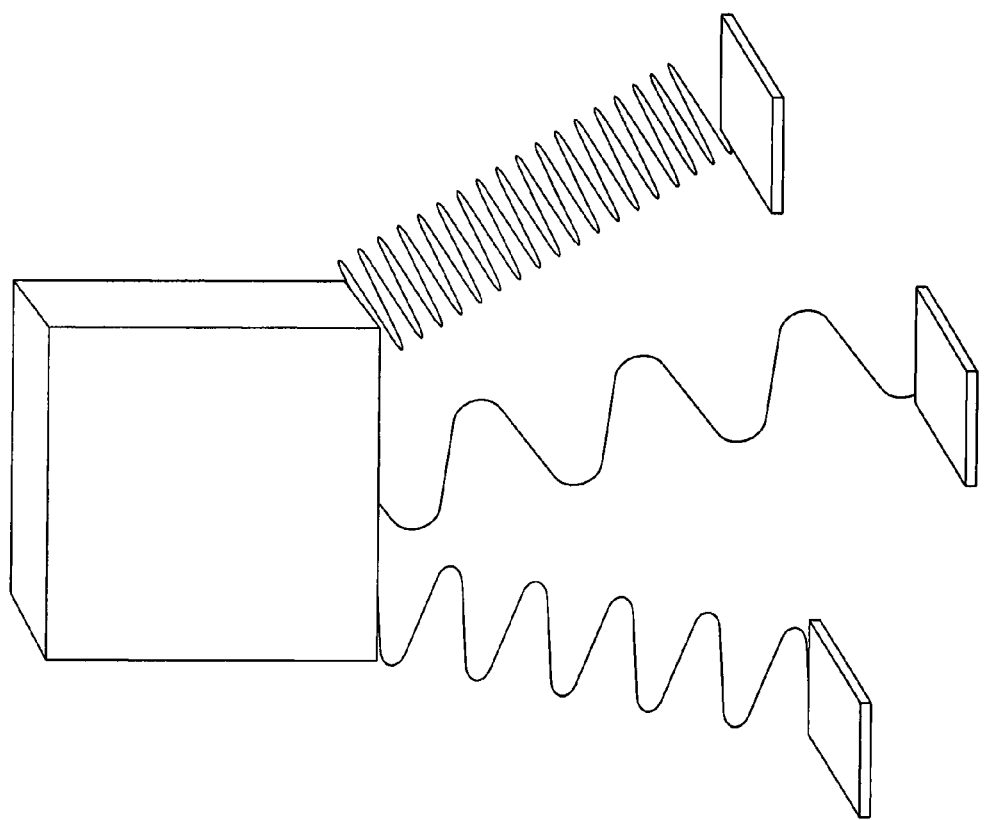
FIG. 17 shows the RFID-tag reader emitting multiple different RF carrier signals with different frequencies.

A number of different techniques are used to allow for successful interrogation, by an RFID-tag reader, of multiple RFID tags within its range. First, as shown in FIG. 17, the RFID-tag reader may emit multiple different RF carrier signals with different frequencies. RFID tags can be designed to each receive energy from, and respond to, one of a number of different RF carrier frequencies. Providing that there are sufficient available RF carrier-signal frequencies so that each of the multiple RFID tags within an RFID-tag reader's field responds to a different RF carrier-signal frequency, then frequency-based multiplexing, as shown in FIG. 17, represents an effective approach to interrogation of multiple RFID tags within the range, or field, of an RFID-tag reader.

Figure 18C:
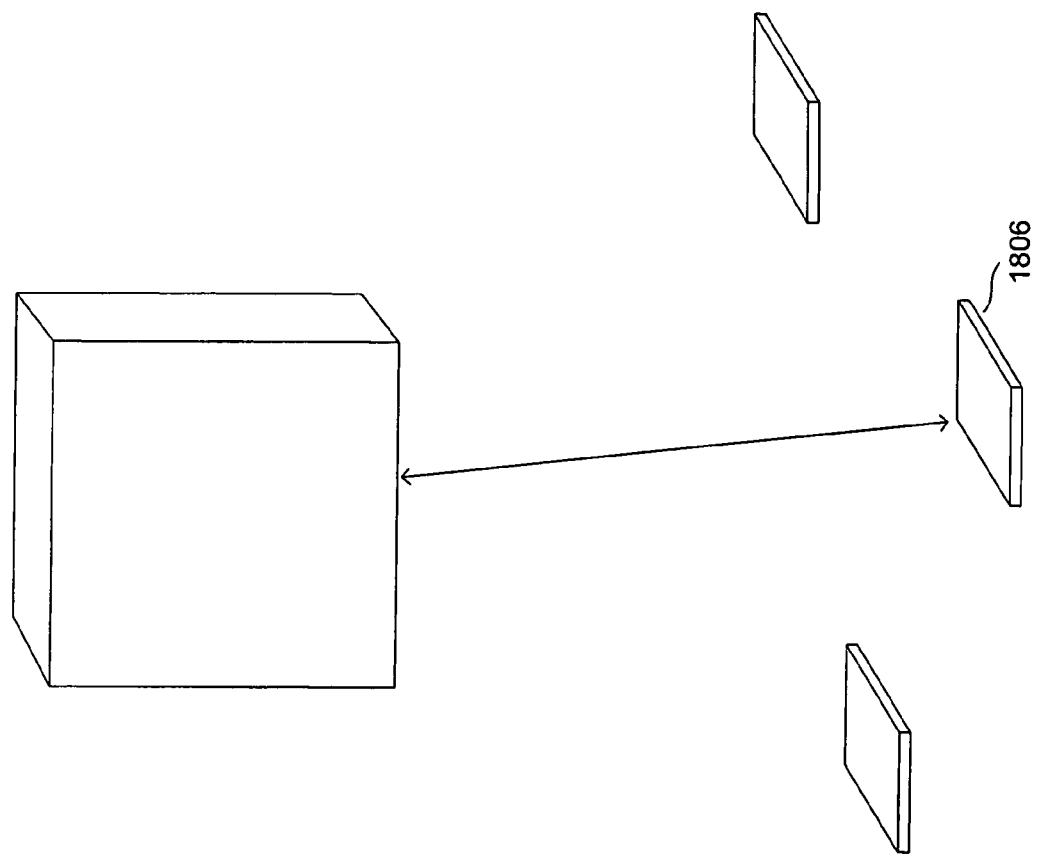

Another approach to interrogating multiple RFID tags within an RFID-tag reader's field is to use time-based multiplexing by RFID tags and RFID-tag readers. FIGS. 18A-C illustrate one time-based multiplexing technique that employs a collision-avoidance technique. Returning briefly to FIG. 16, in the case that multiple RFID tags that all respond to a single RF frequency attempt to respond simultaneously or concurrently to a detected RF carrier signal broadcast by an RFID-tag reader, the RFID tags, as well as the RFID-tag reader, can detect multiple, overlapping attempts to modulate the RF carrier signal, and the RFID tags can immediately cease transmitting information back to the RFID-tag reader. Each RFID tag then waits for a period of time determined by information stored within the RFID tag, and then again attempts to transmit information back to the RFID-tag reader. Different RFID tags wait for different periods of time before attempting retransmission as a result of the different back-off times stored in each of the RFID tags. Thus, in FIG. 18A, a first RFID tag 1802 with the shortest stored back-off time waits for that back-off time and then transmits the identification information stored within the RFID tag back to the RFID reader. Next, as shown in FIG. 18B, a second RFID tag 1804 with the second-longest stored back-off time completes waiting, and then transmits the information stored within the second RFID tag's memory back to the RFID tag reader. Finally, as shown in FIG. 18C, the RFID tag 1806 with the longest stored back-off time completes waiting, and then transmits the information stored within the third RFID tag's memory back to the RFID tag reader. Similar back-off algorithms are employed for collision avoidance in Ethernet local area networks and in various communication protocols.

Although frequency multiplexing and time-based multiplexing can be used to attempt to avoid simultaneous transmission by two or more RFID tags, or collisions, when multiple RFID tags are within the field of an RFID tag reader, a sufficient number of RFID tags within the field of an RFID-tag reader may overwhelm either approach and lead to collisions and failures to receive information by the RFID-tag reader from one or more RFID tags within the field. FIG. 19 shows a large number, 17, of different RFID tags within the field of, and properly oriented with respect to, a single RFID-tag reader. In the case shown in FIG. 19, if there are less than 17 available frequencies for frequency-based multiplexing, or less than 17 different back-off times available for time-based multiplexing, one or more collisions between transmitting RFID tags may occur. The problem may be exacerbated, in the case of time-based multiplexing, when the RFID tags are moving relative to the RFID-tag reader, so that the multiple RFID tags are present within the field of the RFID-tag reader for only a limited duration of time.

FIG. 20 illustrates an even more complex situation in which 17 different RFID tags are within the field of, and properly oriented with respect to, three different RFID-tag readers. Although complex protocols may be developed to extend time-based multiplexing, frequency-based multiplexing, or other types of multiplexing to multiple RFID-tag reader/multiple RFID-tag situations such as that shown in FIG. 20, such techniques and protocols are not currently employed in the vast majority of RFID tags and RFID-tag readers. One significant problem is that the cost of individual RFID tags is often a significant bottleneck for commercial RFID-tag use. Only when RFID tags can be cheaply manufactured and used can the convenience and reliability of RFID-tag labeling be economically justified. Therefore, the bulk of RFID tags are simple, passive RFID tags without complex circuitry for complex collision-avoidance strategies that would effectively deal with multiple RFID-tag reader/RFID-tag situations such as that shown in FIG. 20. For this reason, manufacturers, vendors, and users of RFID-tag-based labeling have recognized the need for strategies by which collisions can be avoided in multiple RFID-tag-reader networks in which multiple RFID-tag readers attempt to interrogate expensive, single-frequency RFID tags.

Partitioning Methods for Collision Avoidance

Figure 21:
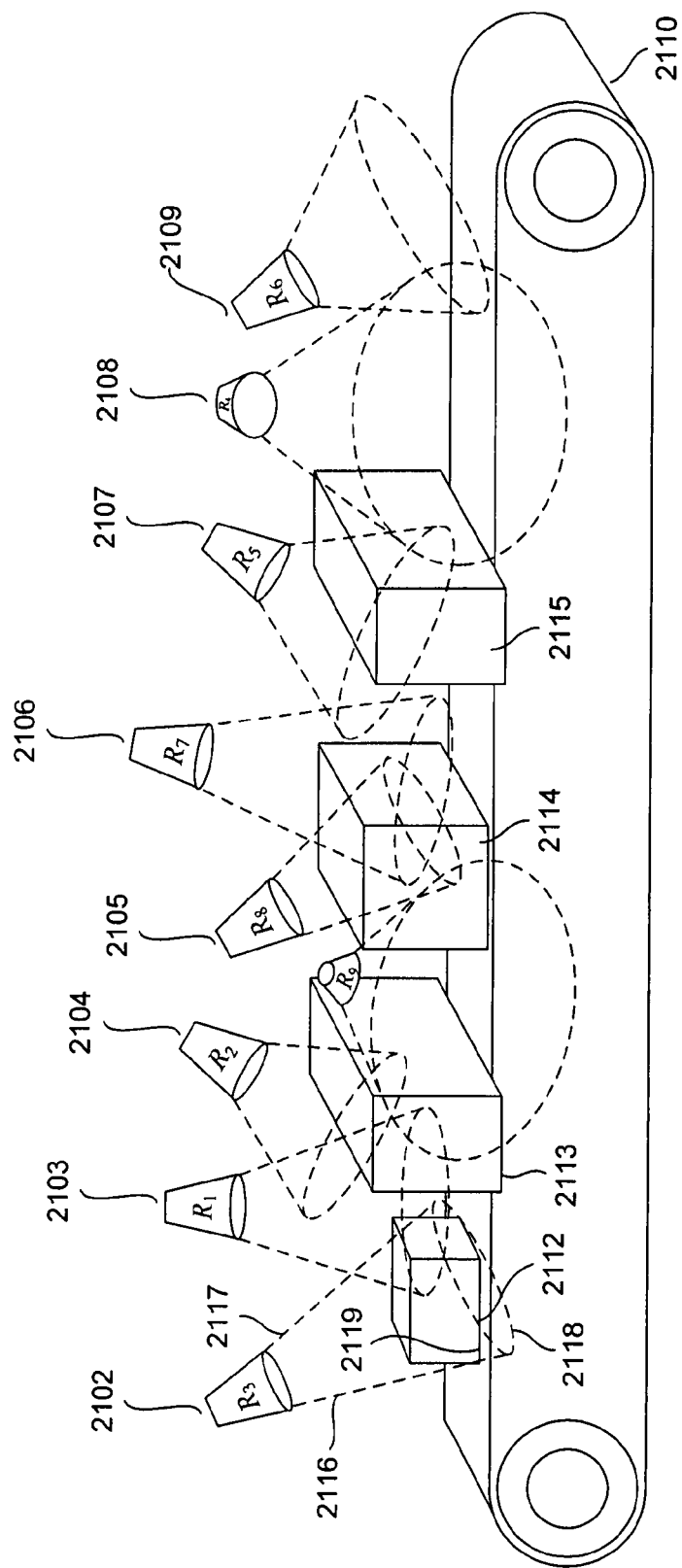
FIG. 21 illustrates a multiple RFID-tag-reader network that is used for describing method and system embodiments of the present invention.

FIG. 21 illustrates a multiple RFID-tag-reader network that is used in the following discussion. In FIG. 21, and in subsequent figures that show the multiple-RFID-tag-reader environment shown in FIG. 21, nine different RFID-tag readers 2102-2109 are arranged above and around a conveyor belt 2110 which transports parcels 2112-2115 past the RFID-tag readers so that RFID tags within the parcels can be interrogated. The fields of the RFID-tag readers are indicated in FIG. 21 by cone-shaped volumes delineated with dashed lines. For example, the field of RFID-tag reader $R_3$ 2102 is indicated by dashed lines 2116-2119. The RFID-tag readers have different orientations and field dimensions to maximize the probability that at least one RFID-tag reader from among the nine RFID-tag readers can successfully interrogate each RFID tag within a parcel that passes the RFID-tag readers.

Figure 22:
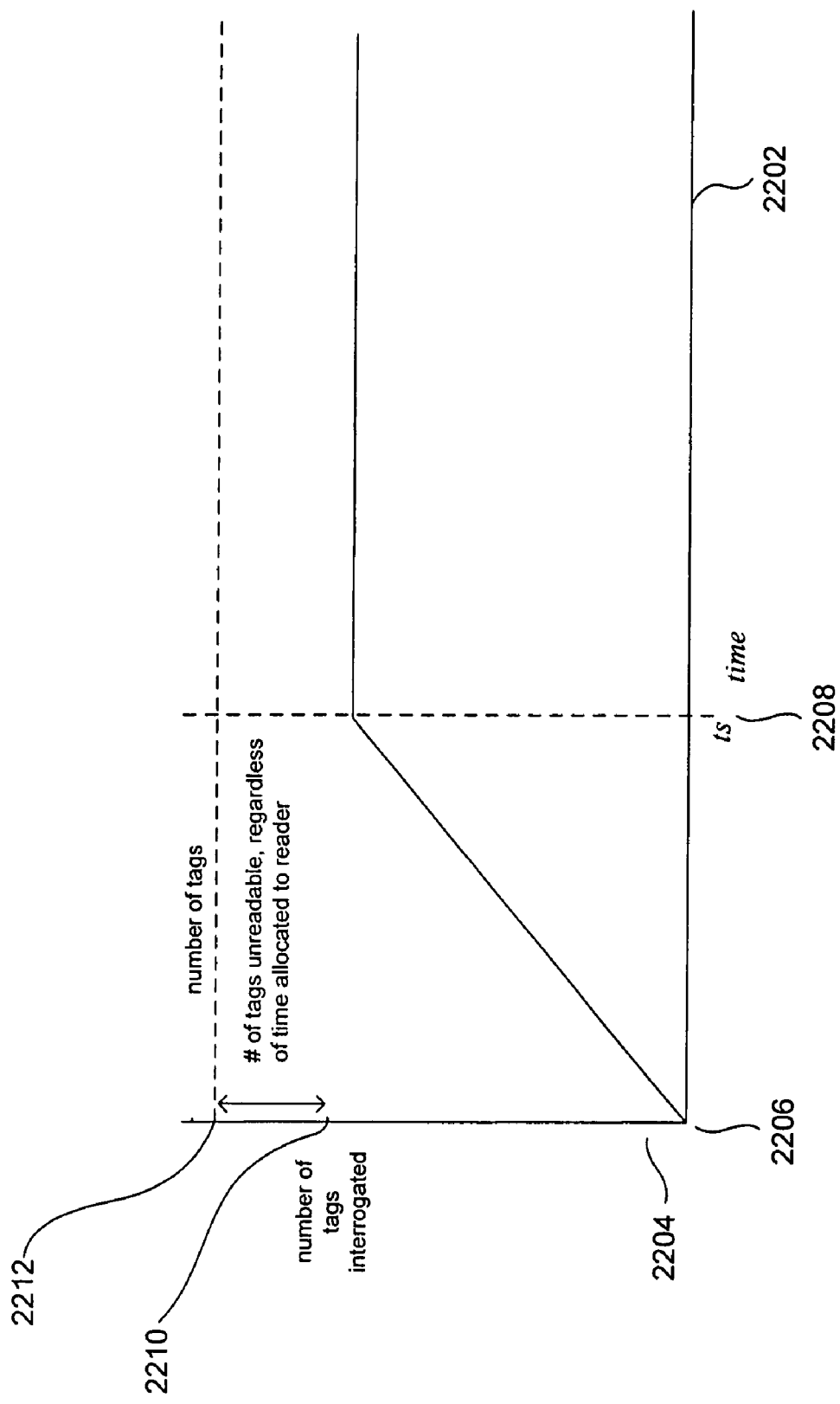
FIG. 22 illustrates a model RFID-tag-reader saturation curve.

Each RFID-tag reader can be characterized with a saturation time. When a set of RFID tags are present within the field of an RFID-tag reader, assuming that the RFID-tag reader and RFID tags employ time-based multiplexing by means of a back-off collision-avoidance method, the RFID-tag reader can steadily interrogate more and more RFID tags within its field over time up to a saturation time $t_s$, past which the RFID-tag reader cannot interrogate any additional tags. FIG. 22 illustrates a model RFID-tag-reader saturation curve. The horizontal axis 2202 represents time and the vertical axis 2204 represents the number of tags successfully interrogated by an RFID-tag reader. At time t=0 2206, no tags have been interrogated. As the time increases up to the saturation time $t_s$ 2208, the number of tags successfully interrogated linearly rises up to a saturation point 2210 representing the total number of tags that can be successfully interrogated by the RFID-tag reader. In general, the saturation point 2210 is below the total number of tags 2212 within the field of the RFID-tag reader. Often, particularly with inexpensive, passive RFID tags, a certain number of RFID tags within the field may be orientated so that the RFID-tag antennas do not sufficiently strongly couple with the RF carrier signal emitted by the RFID-tag reader to extract sufficient power to energize the RFID-tags' IC. In other cases, the tags may be defective or incompatible with the RFID-tag reader. Although a linear saturation curve is assumed, in the following discussion, a variety of different types of saturation curves may be observed for different RFID-tag readers and RFID tags. Saturation curves may be S-shaped, or described by any of a variety of different polynomial, transcendental, and other types of functions.

Figure 23:
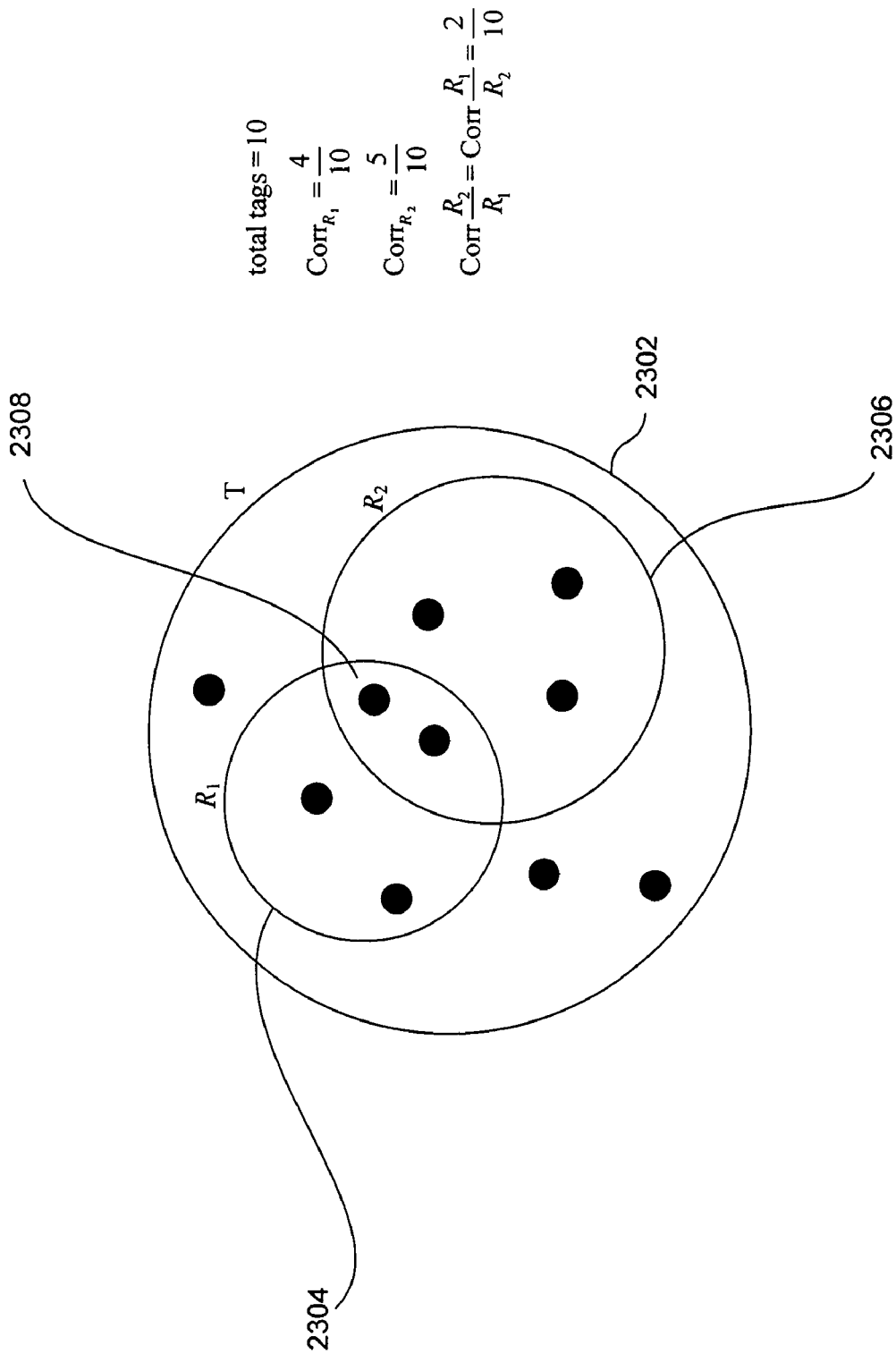
FIG. 23 illustrates two different types of correlations associated with RFID-tag readers in multi-RFID-tag-reader networks.

In a multi-RFID-tag-reader network, each RFID-tag reader can be characterized by a correlation between the RFID-tag reader and the RFID tags that move through the RFID-tag-reader's field, as well as by pairwise correlations between the RFID-tag reader and all other RFID-tag readers in the multi-RFID-tag-reader network. FIG. 23 illustrates two different types of correlations associated with RFID-tag readers in multi-RFID-tag-reader networks. In FIG. 23, the total number of RFID tags that can be potentially interrogated by two different RFID-tag readers $R_1$ and $R_2$ are contained within an outer circle 2302 labeled "T," each RFID tag represented by a small, filled circle. Of the total number of RFID tags that may be interrogated by each of the RFID-tag readers, the number of RFID tags that are successfully interrogated by RFID-tag reader $R_1$ are contained within the inner circle 2304 labeled $R_1$ in FIG. 23. Similarly the tags successfully interrogated by the RFID-tag reader $R_2$ are contained within the inner circle 2306 in FIG. 23. The number of tags successfully read by both of the RFID-tag readers $R_1$ and $R_2$ is represented in FIG. 23 by the intersection between the areas circumscribed by circles 2304 and 2306 2308. The correlation of the first RFID-tag reader $R_1$ with the tags within its field, or correlation with the event, designated $corr_{R_1}$, is the number of RFID tags successfully read by RFID-tag reader $R_1$ divided by the number of RFID tags potentially successfully interrogated by RFID-tag reader $R_1$ or, in the example shown in FIG. 23, 4/10 or 0.4. Similarly, the correlation of RFID-tag reader $R_2$, $corr_{R_2}$, with the event is, in the example shown in FIG. 23, 5/10 or 0.5. The pairwise correlation between the two RFID-tag readers $R_1$ and $R_2$, designated $corr_{R_1}^{R_2}$, is equal to the number of RFID tags successfully interrogated by both RFID-tag readers $R_1$ and $R_2$ divided by the total number of RFID tags potentially successfully interrogated by either or both of the RFID-tag readers, in the example shown in FIG. 23, 2/10 or 0.2. Highly correlated RFID-tag readers may, in an environment such as that depicted in FIG. 21, represent a redundancy. RFID-tag readers with low correlations to the event, the event in the environment depicted in FIG. 21 being the total number of RFID tags within parcels that pass through the fields of the multiple RFID-tag readers during some period of time, suggest that the RFID-tag readers are ineffective, contribute little to the overall interrogation effectiveness of the multi-RFID-tag-reader network, and are potentially dispensable.

Figure 24:
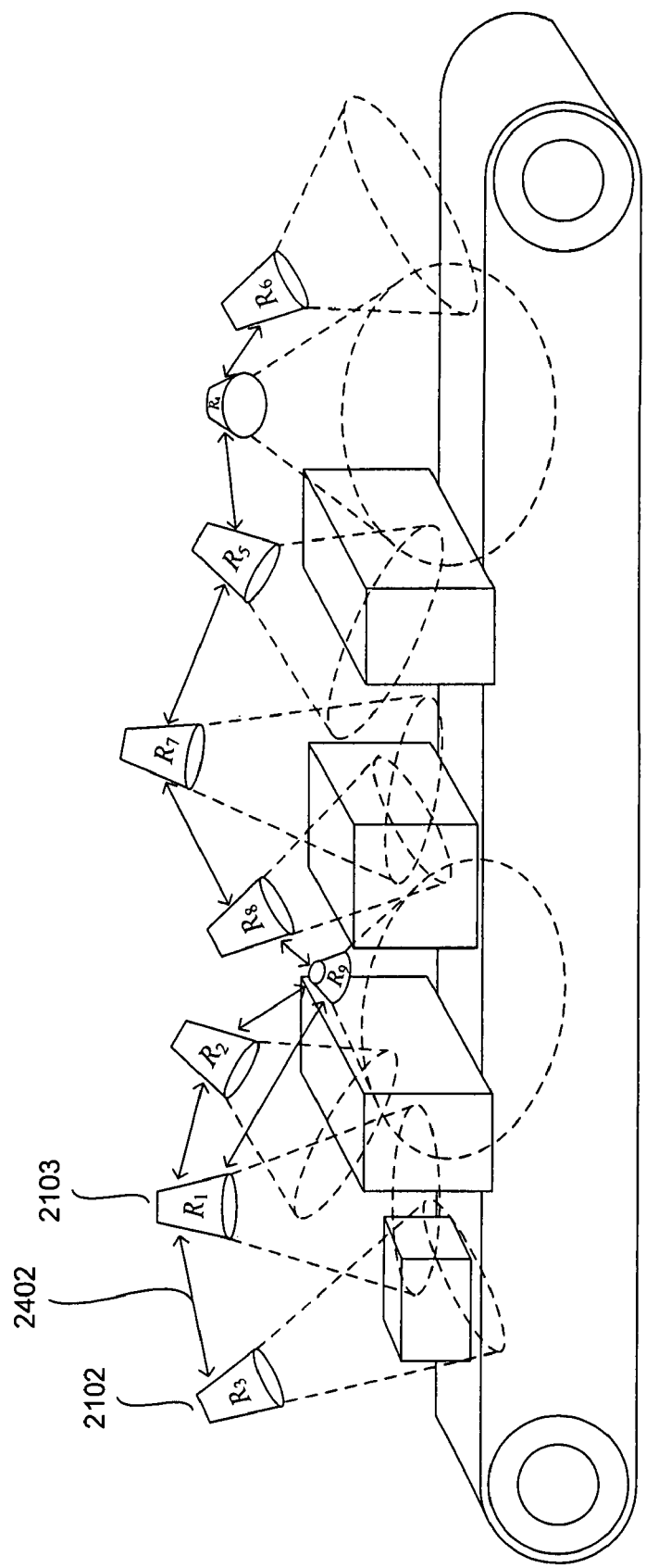
FIG. 24 illustrates pairwise interferences between RFID-tag readers in the multi-RFID-tag-reader network depicted in FIG. 21.

FIG. 24 illustrates pairwise interferences between RFID-tag readers in the multi-RFID-tag-reader network depicted in FIG. 21. In FIG. 24, RFID-tag readers with overlapping fields are indicated by double-headed arrows, such as double-headed arrow 2402 indicating that the fields of RFID-tag reader $R_3$ 2102 overlaps with the field of RFID-tag reader $R_1$ 2103. When RFID-tag-reader fields overlap, collisions may occur when RFID tags within the overlapped portion of the two fields attempt to respond to RF carrier signals emanating from the two different RFID-tag readers.

Figure 25:
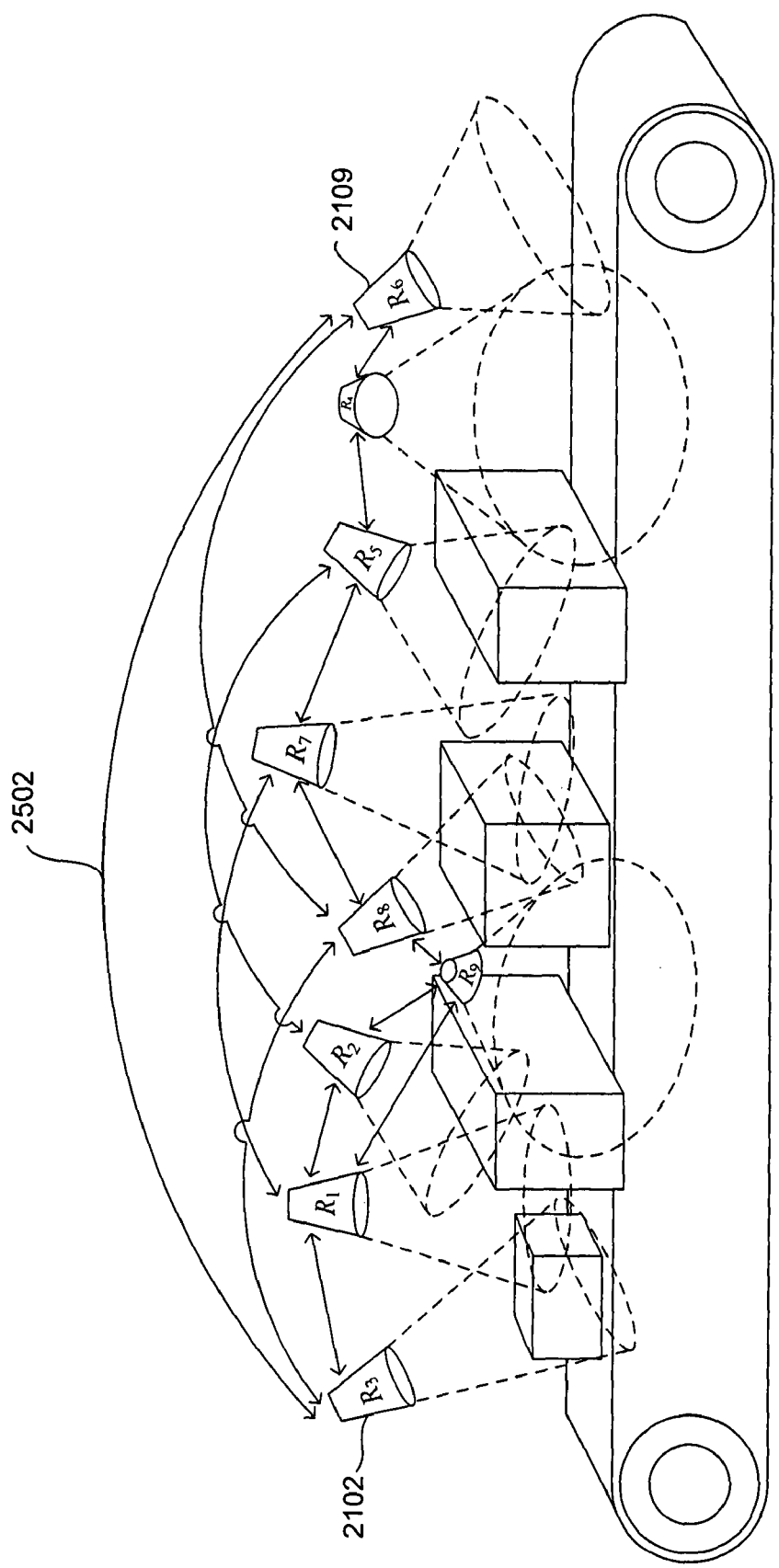
FIG. 25 illustrates high correlations between pairs of RFID-tag readers in the multi-RFID-tag-reader network shown in FIG. 21.

FIG. 25 illustrates high correlations between pairs of RFID-tag readers in the multi-RFID-tag-reader network shown in FIG. 21. In FIG. 25, double-headed arrows indicate high correlations between pairs of RFID-tag readers, such as the double-headed arrow 2502 that indicates a high correlation between RFID-tag reader $R_3$ 2102 and RFID-tag reader $R_6$ 2109. In general, high correlations exist between RFID-tag readers with similar orientations in the example of FIGS. 21 and 24-25.

Certain method and system embodiments of the present invention employ graph-theoretical modeling of a multi-RFID-tag-reader network, or network, such as that shown in FIG. 21. Two different collision-graph representations of the multi-RFID-tag-reader network shown in FIGS. 21 and 24-25 are provided in FIG. 26. In a first collision-graph representation 2602, the RFID-tag readers are represented by vertices, or nodes, such as vertex 2604 representing RFID-tag-reader $R_4$ (2108 in FIG. 21). Interferences between RFID-tag readers within the RFID-tag-reader network are represented by edges between vertices or nodes. For example, edge 2606 between vertices 2608 and 2610 representing RFID-tag readers $R_3$ 2102 and $R_1$ 2103 represents the interference illustrated in FIG. 24 by double-headed arrow 2402. In the first graph representation 2602 of the multi-RFID-tag-reader network, dashed circles, such as dashed circle 2612, are drawn around sets of RFID-tag readers that represent independent subsets of vertices. Thus, there are no edges between the vertices 2614-2617 within dashed circle 2612 indicating that there are no interferences between the RFID-tag readers represented by vertices 2614-2617. The minimal k for which collision graph 2602 is k-partite is three. An alternative collision-graph representation 2618 of the multi-RFID-tag-reader network shown in FIG. 21 is also provided in FIG. 26.

In general, in the case of frequency-based multiplexing or time-based multiplexing under conditions in which each RFID-tag reader has sufficient time to reach its saturation point for each collection of RFID tags passing within portions of its field that do not overlap with the fields of other RFID-tag readers, one can obtain optimal RFID-tag interrogation efficiency, or successful interrogation of as many RFID tags that pass through the fields of the RFID-tag readers as possible, by the multi-RFID-tag-reader network by turning on only one RFID-tag reader at a time, allowing it to reach its saturation point, turning it off, and then turning on another of the multiple RFID-tag readers so that each RFID-tag reader reaches its saturation point during a given cycle or power-on/power-off operations. Similarly, when a multi-RFID-tag-reader network can be partitioned into a number of independent sets of RFID-tag readers, so that groups of non-interfering RFID-tag readers can be powered-on, one group at a time, in a way that allows all RFID-tag readers to reach saturation, then a perfect scheduling of RFID-tag reader operation can be easily achieved, either by frequency-based or time-based multiplexing. However, when time-based multiplexing is employed by use of back-off collision avoidance methods, as discussed above, and when the RFID tags pass through an RFID-tag-reader's field too quickly to allow the RFID-tag reader to reach the saturation point, devising optimal interrogation strategies can be a complex undertaking. In such cases, it is desirable to power each of the RFID-tag readers as long as possible, in order to allow each of the RFID-tag readers to approach its saturation point as closely as possible, but alternately powering-on and powering-off RFID-tag readers with overlapping fields to avoid collisions. Such a strategy may be further adjusted by recognizing that only one of a highly correlated pair of multi-tag-readers needs to be powered-on for significant periods of time, since the highly correlated readers represent redundant interrogation, and by also recognizing that an RFID-tag reader with a low correlation to the event may be given substantially less time, or may be powered off entirely, since an RFID-tag reader with low correlation to the event may not contribute greatly to the overall degree of successful interrogation by the multi-RFID-tag-reader network. One approach to achieving efficient or optimal operation of a multi-RFID-tag-reader network is to alter the network so that the network can be modeled as a low-partite graph, if the original network cannot be so modeled. In certain cases, when the network can be modeled as a bipartite graph, or altered so that the network can be modeled as a bipartite graph, the greatest amount of operation time can be allocated to each RFID-tag reader within the network during each complete cycle of power-on/power-off operations, particularly in cases in which the bipartite-graph model can be achieved by rearrangement of RFID-tag readers to remove interferences or by eliminating low-event-correlation RFID-tag readers. In general, the interrogation efficiency can be considered to be the number of RFID tags successfully interrogated by at least one RFID-tag reader in a multi-RFID-tag-reader network divided by the total number of RFID tags that pass through the fields of at least on RFID-tag reader in the multi-RFID-tag-reader network.

Figure 27:
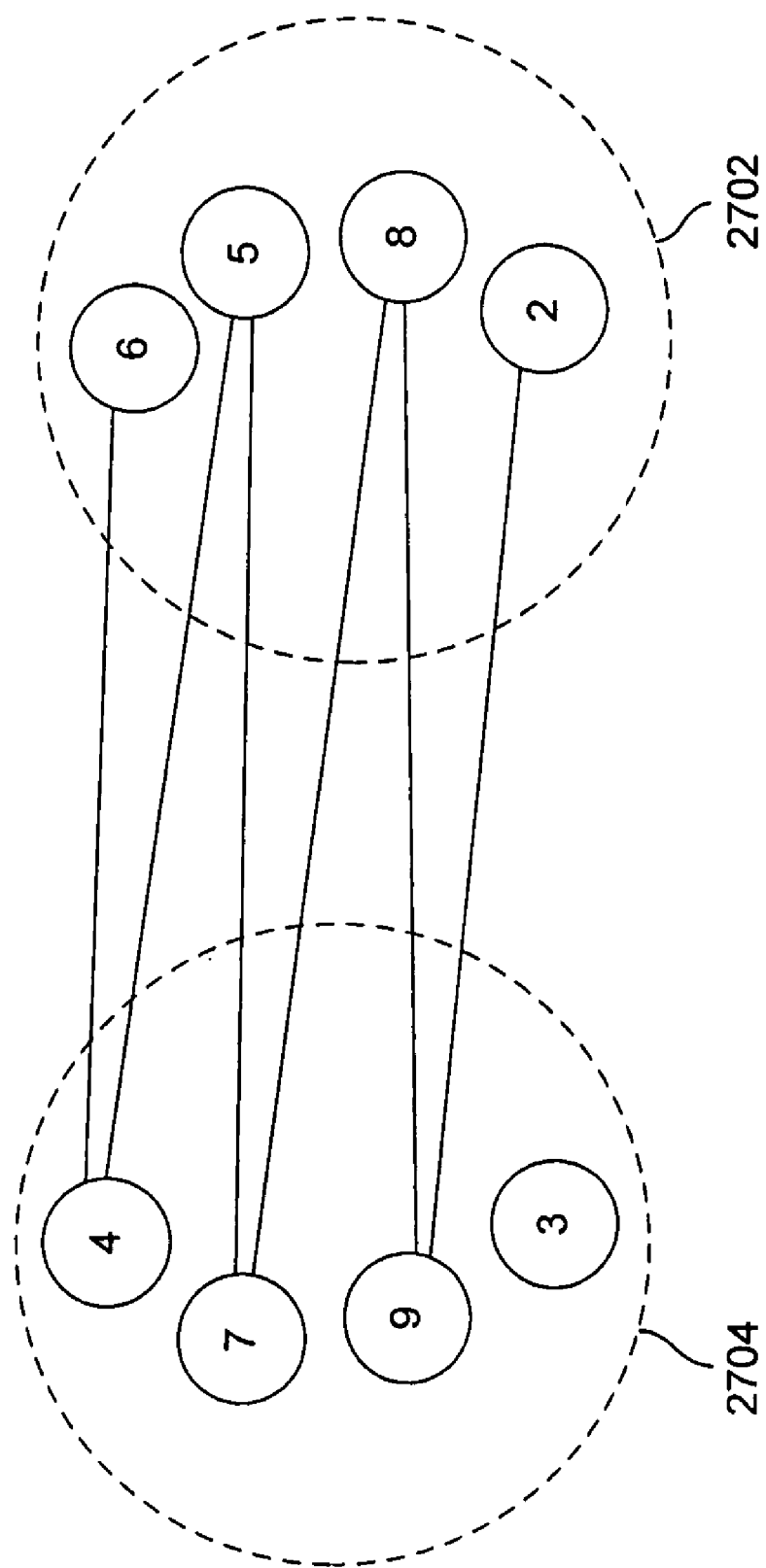
FIG. 27 illustrates a first approach to achieving efficiency in a multi-RFID-tag-reader network.

FIG. 27 illustrates a first approach to achieving efficiency in a multi-RFID-tag-reader network. FIG. 27 is a collision graph of the multi-RFID-tag-reader network illustrated in FIG. 21 that has been altered by removing, or permanently powering down, one of the RFID-tag readers. This can be seen by comparing the collision graph shown in FIG. 27 with collision graph 2602 in FIG. 26. The altered collision graph shown in FIG. 27 is a bipartite collision graph obtained by removing RFID-tag reader $R_1$ (2103 in FIG. 21). By removing RFID-tag reader $R_1$, the remaining RFID-tag readers can be partitioned into two independent subsets or, in other words, into two non-interfering groups. Removal of RFID-tag reader $R_1$ is an example of a node-removal perturbation of a multi-RFID-tag-reader network modeled as a collision graph. RFID-tag reader $R_9$ may also have been removed to produce a bipartite, altered collision graph, but it may be more desirable to remove RFID-tag reader $R_1$ since RFID-tag reader $R_1$ is highly correlated with RFID-tag reader $R_7$, while RFID-tag reader $R_9$ is not strongly correlated with any other RFID-tag reader in the multi-RFID-tag-reader network.

It may not be necessary to alter a multi-RFID-tag network in order to achieve an efficient interrogation schedule. The original multi-RFID-tag network may already be bipartite. Alternatively, the original multi-RFID-tag network may have a minimum k for which the collision graph representing the multi-RFID-tag network is k-partite that is of sufficiently small magnitude to allow for an efficient interrogation schedule to be devised. Thus, for example, the originally 3-partite multi-RFID-tag network illustrated in FIG. 21 may be sufficiently efficiently schedulable, without removing any nodes.

Figure 28:
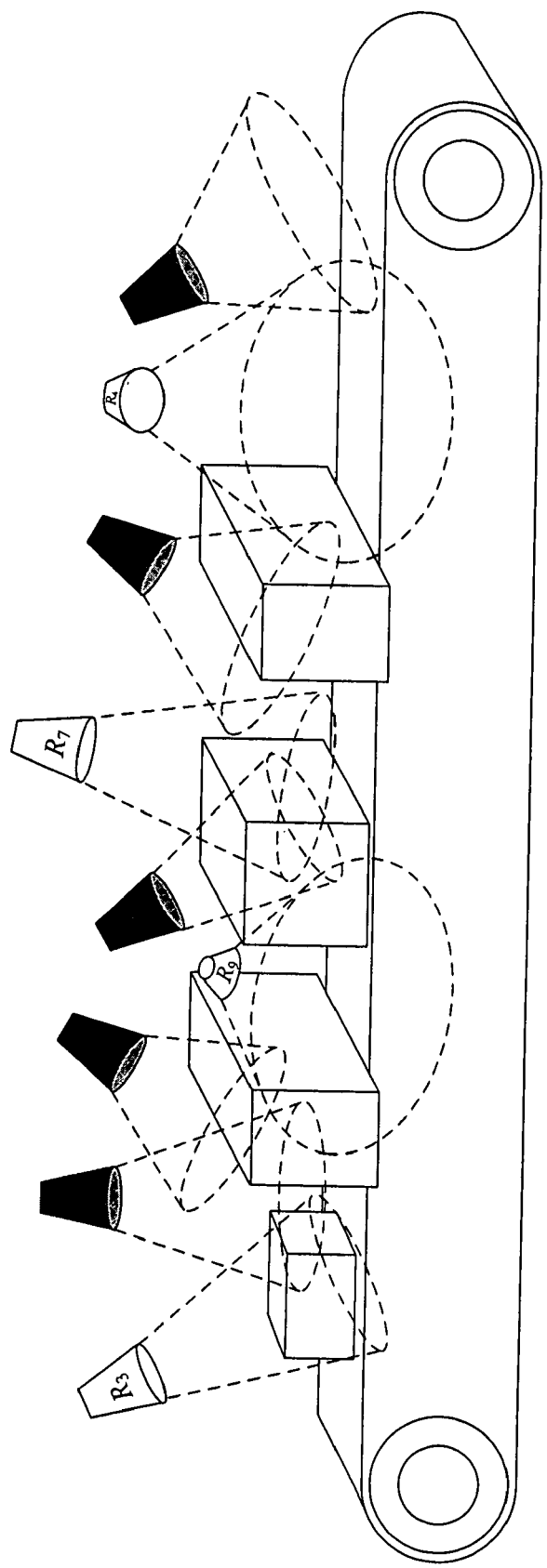
Figure 29:
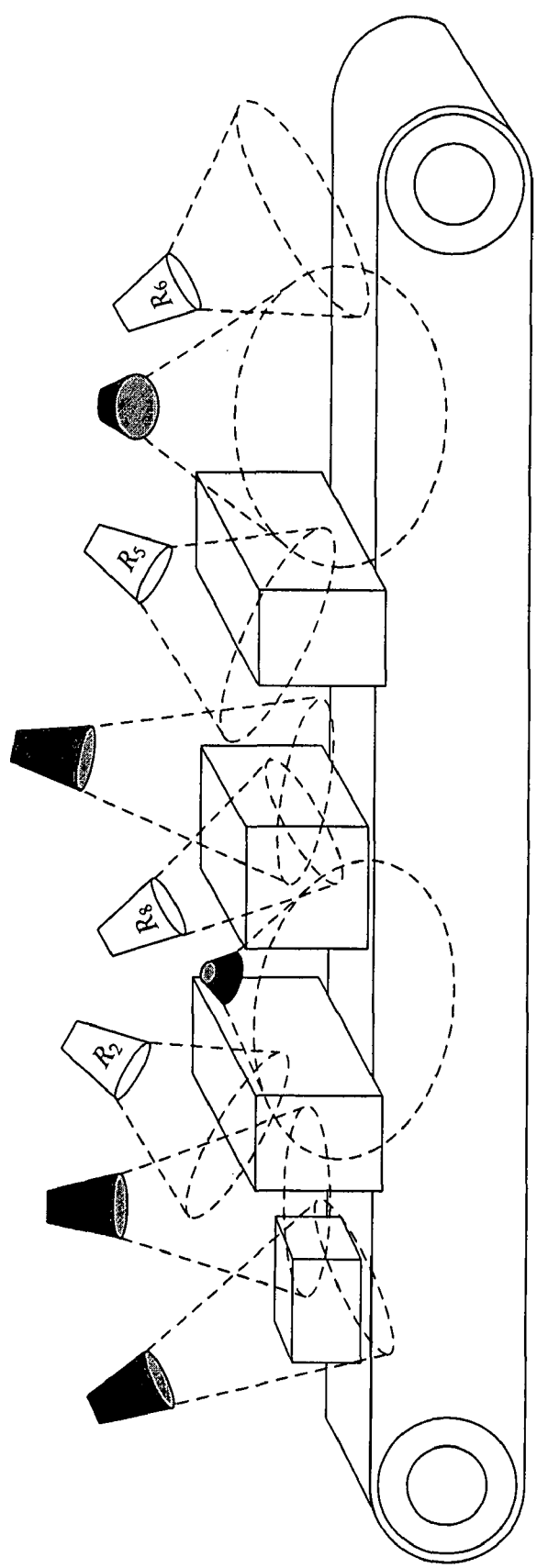

Having removed, or permanently powered down, RFID-tag reader $R_1$, a simple interrogation strategy is to alternate powering-up and powering-down of each independent subset of RFID-tag readers for equal-length periods. FIG. 28 illustrates a first period in a cycle of power-on/power-off operations of the interrogation strategy in which RFID-tag readers of independent subgroup 2702 in FIG. 27 are powered-on. FIG. 29 illustrates a second period in a cycle of power-on/power-off operations of an interrogation strategy in which RFID-tag readers of a second independent subgroup 2704 in FIG. 27 are powered-on. In FIGS. 28 and 29, powered-off RFID-tag readers are shown darkly shaded, while powered-on RFID-tag readers are shown unshaded. In both cycles, RFID-tag-reader $R_1$ is powered off. By alternating the periods shown in FIGS. 28 and 29, each RFID-tag reader is given as much time as possible without chance of collisions due to interference between pairs of RFID-tag readers. Additional factors may be considered to choose the groupings of RFID-tag readers, when multiple groupings are possible, and to choose the respective lengths of periods. For example, in the case illustrated in FIGS. 27-29, it may turn out that RFID-tag readers $R_4$, $R_7$, $R_9$, and $R_3$, all belonging to the second independent subgroup 2704 in FIG. 27, may have much higher event correlations than the RFID-tag readers in the first independent subgroup 2702 in FIG. 27. In this case, it may be prudent to power on the RFID-tag readers of the second group 2704 in FIG. 27 for a longer period of time than the RFID-tag readers of the first group 2702. In other words, in this case, the length of the second period shown in FIG. 29 may be longer than the length of the first period, shown in FIG. 28, to increase the total number of RFID tags that can be successfully interrogated by the multi-RFID-tag-reader network.

Weights may be assigned to nodes of a collision graph to assist in choosing nodes for removal and/or choosing a partition of the collision graph into k partitions that can be then scheduled as a cycle of power-on/power-off periods in which each of the RFID-tag readers represented by the nodes in a next partition selected from among the k partitions is powered on, while the remaining RFID-tag readers represented by the nodes in a next partition selected from among the k partitions is powered on One technique for partitioning a collision graph into k independent subsets of nodes is to color the graph with k different colors. When a perfect coloring of a graph is obtained, the graph can be partitioned into k independent subsets of nodes by placing all nodes of each color into a separate partition. Otherwise, nodes can be removed, and the graph can be recolored, until a perfect coloring is achieved.

Figure 30:
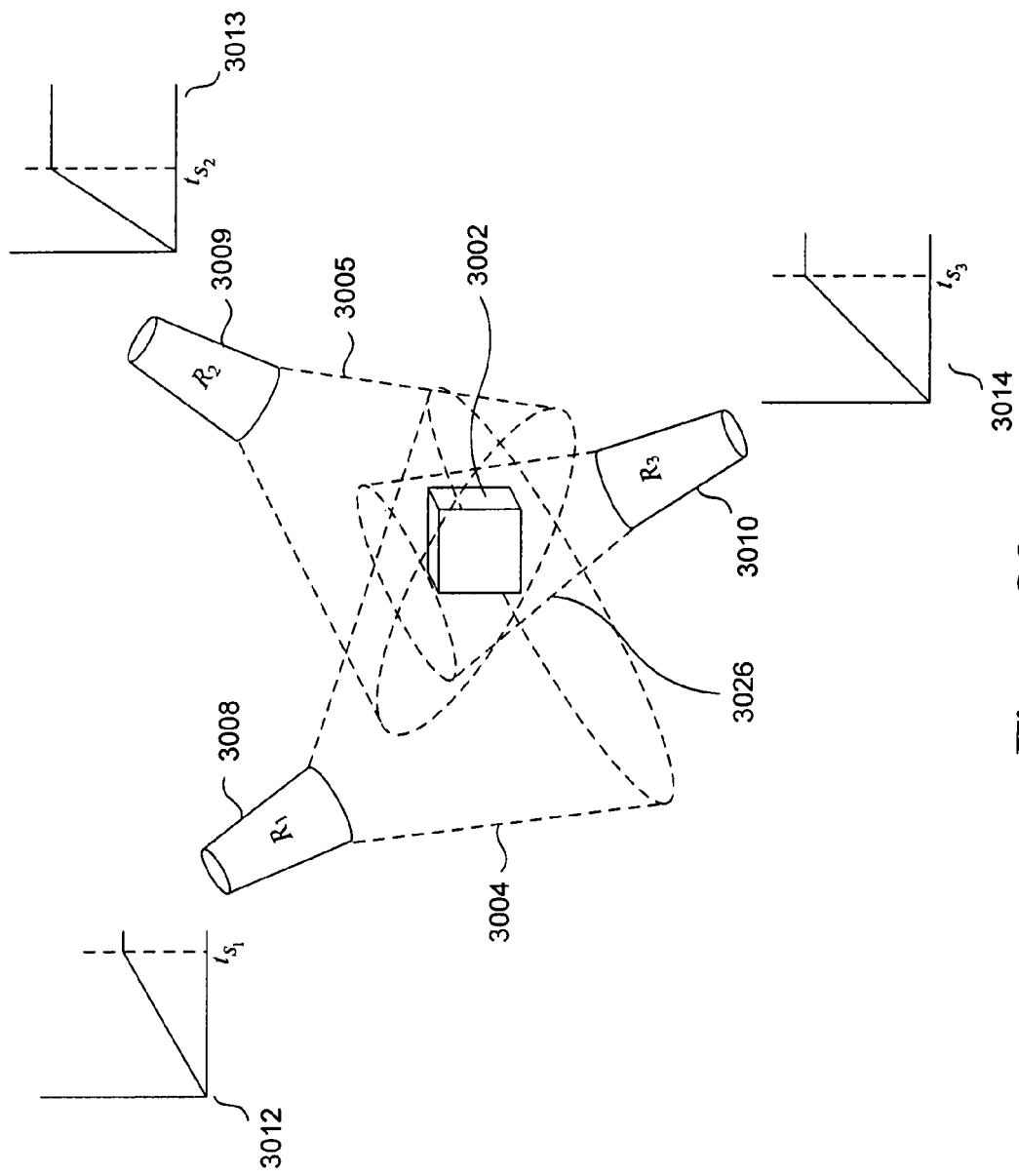
FIGS. 30-31C illustrates considerations of scheduling power-on intervals of multiple RFID-tag readers with overlapping fields for reading tags from a single box within all of the overlapping fields.

Once a reasonable partitioning of a multi-RFID-tag-reader network into k independent subgroups of RFID-tag readers has been obtained, the next task is to schedule power-on and power-off intervals for the subgroups of RFID-tag readers. FIGS. 30-31C illustrates considerations of scheduling power-on intervals of multiple RFID-tag readers with overlapping fields for reading tags from a single box within all of the overlapping fields. In FIG. 30, a box 3002 containing multiple RFID tags is shown within the overlapping fields 3004-3006 of three RFID-tag readers $R_1$ 3008, $R_2$ 3009, and $R_3$ 3010, respectively. The saturation curves 3012-3014 for each of the three RFID tag readers are shown associated with their respective RFID-tag readers in FIG. 30. As can be seen by comparing the slopes of the three saturation curves, RFID-tag reader $R_2$ 3009 has the highest rate of successful interrogation, followed next by RFID-tag reader $R_3$. RFID-tag reader $R_1$ has the lowest rate of successful interrogation. These are rates of successful interrogation by each of the RFID-tag readers alone.

Figure 31A:
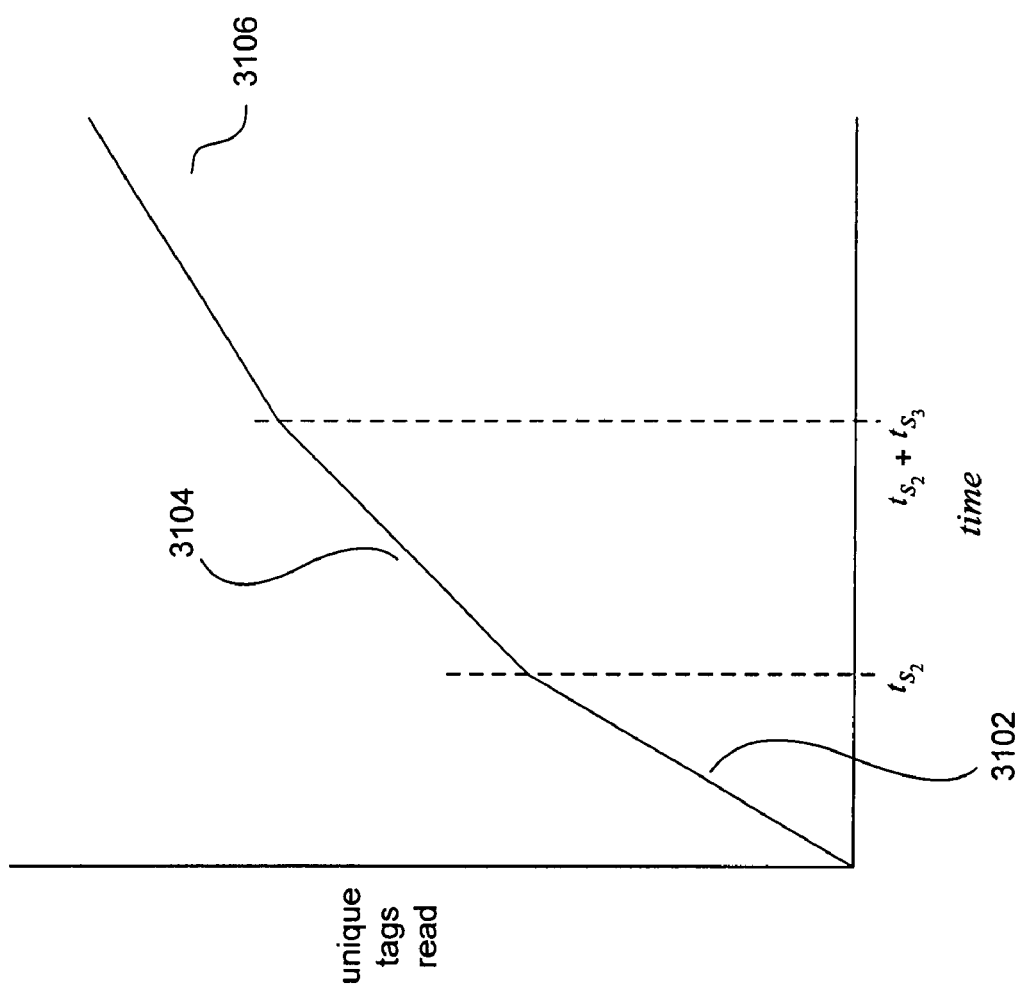

Given the multi-RFID-tag-reader environment illustrated in FIG. 30, an initial optimal interrogation schedule for the three RFID-tag readers can be obtained by scheduling power-on intervals of the RFID-tag readers in decreasing order of successful interrogation rate. FIG. 31A illustrates this initial scheduling. As shown in FIG. 31A, the RFID-tag reader with the greatest successful interrogation rate, $R_2$, is first powered on for time equal to RFID-tag-reader R2's saturation time $t_{s3}$, while RFID-tag readers $R_1$ and $R_3$ are powered off. Then, RFID-tag reader $R_3$, with the next greatest successful interrogation rate, is powered on for a length of time $t_{s3}$, 3104, while RFID-tag readers $R_1$ and $R_2$ are powered off. Finally, RFID-tag reader $R_1$ is powered on 3106 while RFID-tag readers $R_2$ and $R_3$ are powered off. If the total time available for reading is sufficient to allow all three RFID-tag readers to read up to their saturation level, or the total time available is greater than or equal to $t_{s1}+t_{s2}+t_{s3}$, then the greatest number possible of RFID tags are successfully interrogated by the system of three RFID-tag readers, regardless of the ordering of power-on intervals within the power-on/power-off cycle. If the available time is less than $t_{s1}+t_{s2}+t_{s3}$, then the scheduling illustrated in FIG. 31A should nonetheless be used, since this scheduling ensures that the maximum possible number of RFID tags are successfully read within the available time. If the available time is less than $t_{s2}$, for example, it is nonetheless most efficient to power-on the fastest RFID-tag reader $R_2$ for the entire interval.

The scheduling illustrated in FIG. 31A assumes no correlation between pairs of RFID-tag readers. In other words, the rate of unique RFID-tag interrogation during each power-on interval is equal to the rate of successful RFID-tag interrogation for the RFID-tag reader powered on. When the readers are correlated, but when, despite that correlation, the rates of unique RFID-tags successfully read for the three RFID-tag readers have the same order as for the uncorrelated successful interrogation rates, $R_2>R_3>R_1$, then the scheduling illustrated in FIG. 31A remains the optimal scheduling, although the overall rate of successful interrogation of unique RFID tags is substantially less for power-on intervals following the first power-on interval. FIG. 31B illustrates the scheduling assuming pairwise correlation between RFID readers such that the rates of unique RFID-tags successfully read for the three RFID-tag readers have the order $R_2>R_3>R_1$. Note, in FIG. 31B, that total unique RFID tags read increases far less rapidly following completion of RFID-tag reader R2's power-on interval.

However, the pairwise correlation between the three RFID-tag readers shown in FIG. 30 may be such that, despite having a lower standalone rate of successful interrogation, RFID-tag reader $R_1$ successfully interrogates RFID tags not read by RFID-tag reader $R_1$ at a much higher rate than RDIF-tag reader $R_3$, due to a high pairwise correlation between RFID-tag reader $R_2$ and $R_3$ and a low correlation between RFID-tag reader $R_2$ and $R_1$. FIG. 31C illustrates the rate of successful unique RDIF-tag interrogation using the order of power-on intervals used in the schedulings illustrated in FIGS. 31A-B, but assuming that the rates of unique RFID-tags successfully read for the three RFID-tag readers have the order $R_2>R_1>R_3$. The schedule illustrated in FIG. 31C is suboptimal when the total time allocated for reading is less than $t_{s1}+t_{s2}+t_{s3}$, but greater than $t_{s2}$. In this case, RFID-tag reader $R_3$ is least efficient, but is powered-on in favor of RFID-tag reader $R_1$.

As can be seen from the example presented in FIGS. 30-31C, an optimal schedule schedules the most efficient RFID-tag reader first, for that RFID-tag reader's saturation time, and then schedules successive RFID-tag readers for their saturation times in order of their efficiency in reading RFID tags not yet read in preceding power-on intervals. The efficiency in reading RFID tags not yet read in preceding power-on intervals by an RFID-tag reader may depend both on the RFID-tag reader's standalone rate of successful RFID tag interrogation as well as on correlations between the RFID-tag reader and other RFID tag readers.

Figure 32:
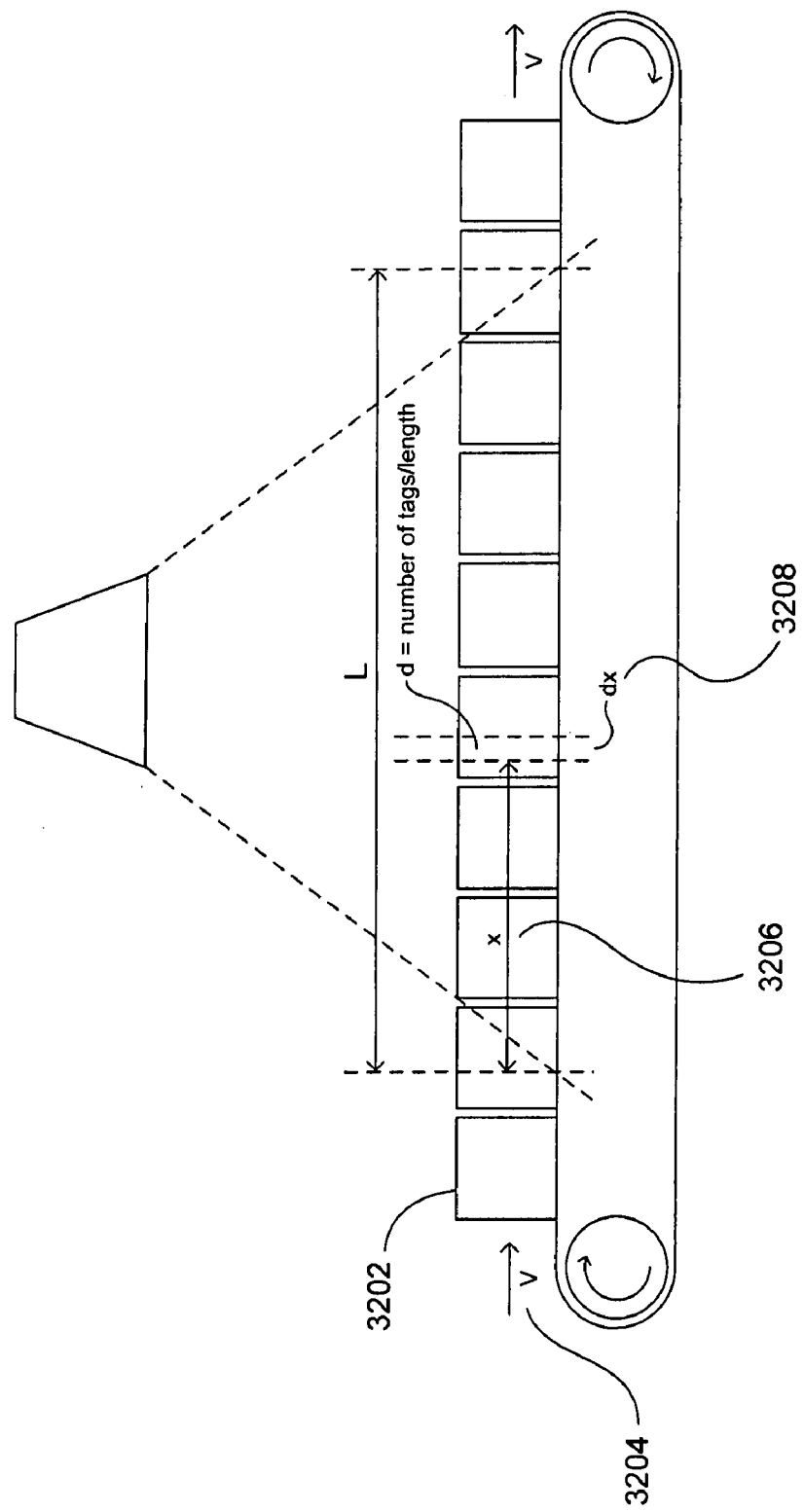
FIG. 32 illustrates calculation of the number of RFID tags read by an RFID tag reader that reads tags in parcels moving along a conveyor belt into and out of the RFID-tag reader's field.

FIG. 32 illustrates calculation of the number of RFID tags read by an RFID tag reader that reads tags in parcels moving along a conveyor belt into and out of the RFID-tag reader's field. In FIG. 32, RFID tags in parcels, such as parcel 3202, move at a velocity v 3204 through a field of width L. The probability that an RFIF tag is successfully read by the RFID-tag reader depends on the distance x 3206 that the tag has moved through the field, or equivalently the time x/v that the RFID tag has spent in the field. The RFID tags are assumed to be present at a density of d tags per linear distance, and the calculation of the tags read in a length of boxes equal to the width of the RFID-tag reader's field considers a differential length dx 3208 within the field.

The probability that an RFID tag within a differential length dx has been read, $P_{dx}$, is:

$$P_{dx} = \left[\frac{\frac{x}{v}}{t_s}\right] Corr_R$$

where $t_s$ is the saturation time for the reader R, and $Corr_R$ is the correlation of the reader with the event. The average number of RFID tags read in the differential length dx is therefore:

$$TagsRead_{dx} = P_{dx}(dx * d) = \begin{bmatrix} \frac{x}{y} \\ \frac{1}{t_s} \end{bmatrix} Corr_R(dx * d)$$

The total number of tags read from the field in the time that it takes for a box moving at velocity v to traverse the field is therefore:

$$TagsRead = \int_0^L \frac{(Corr_R)d}{t_s v} x\, dx$$

$$= \frac{(Corr_R)}{t_s} \frac{d}{2v} L^2$$

Thus, the number of tags read by an RFID-tag reader during an arbitrary length of time, with RFID tags, at an arbitrary density, moving through a field of arbitrary size at constant velocity, is generally proportional to:

$$\frac{Corr_R}{t_s}$$

Figure 33:
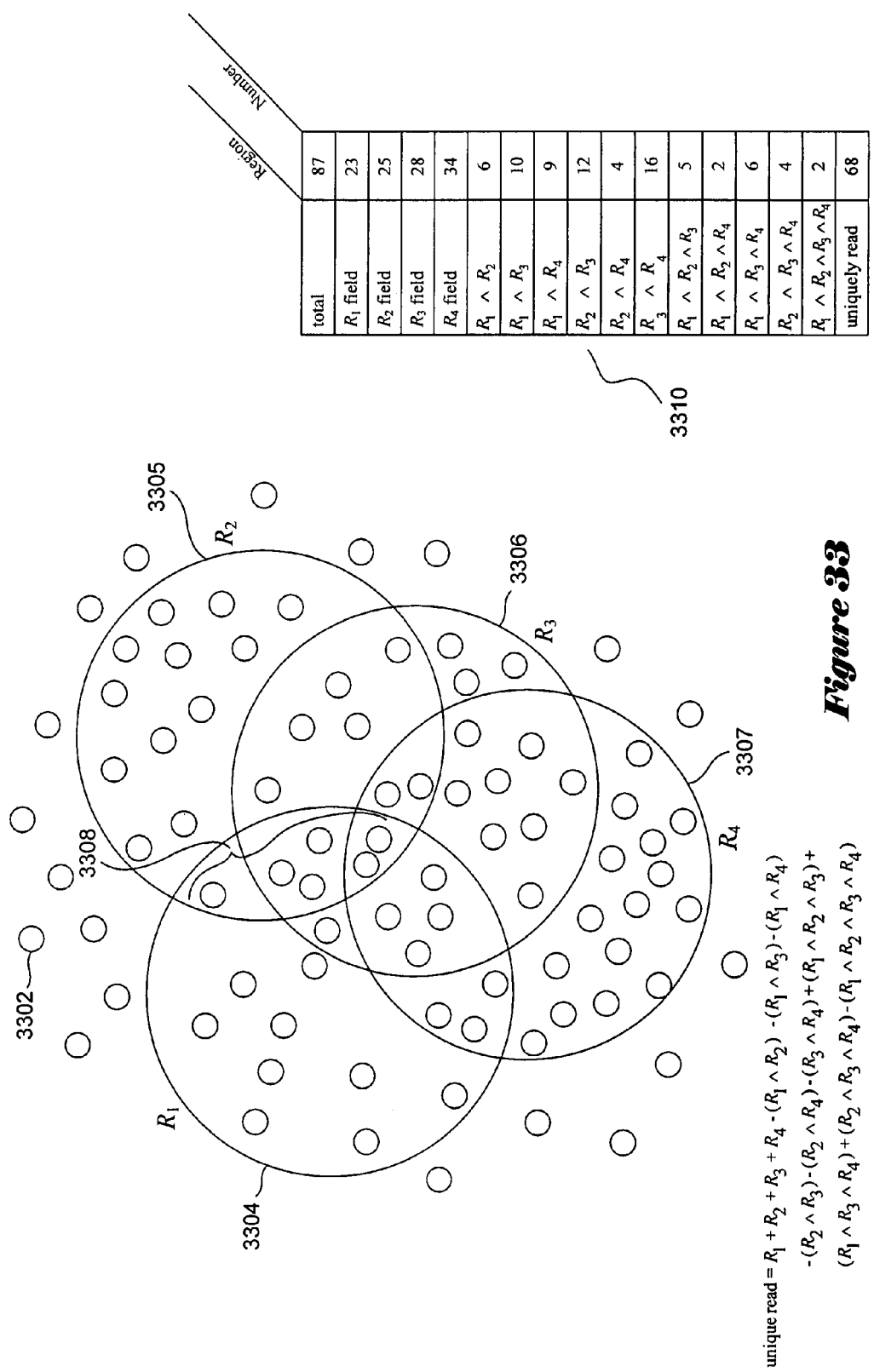
FIG. 33 illustrates computing unique tags read from overlapping fields of multiple RFID-tag readers.
Figure 34:
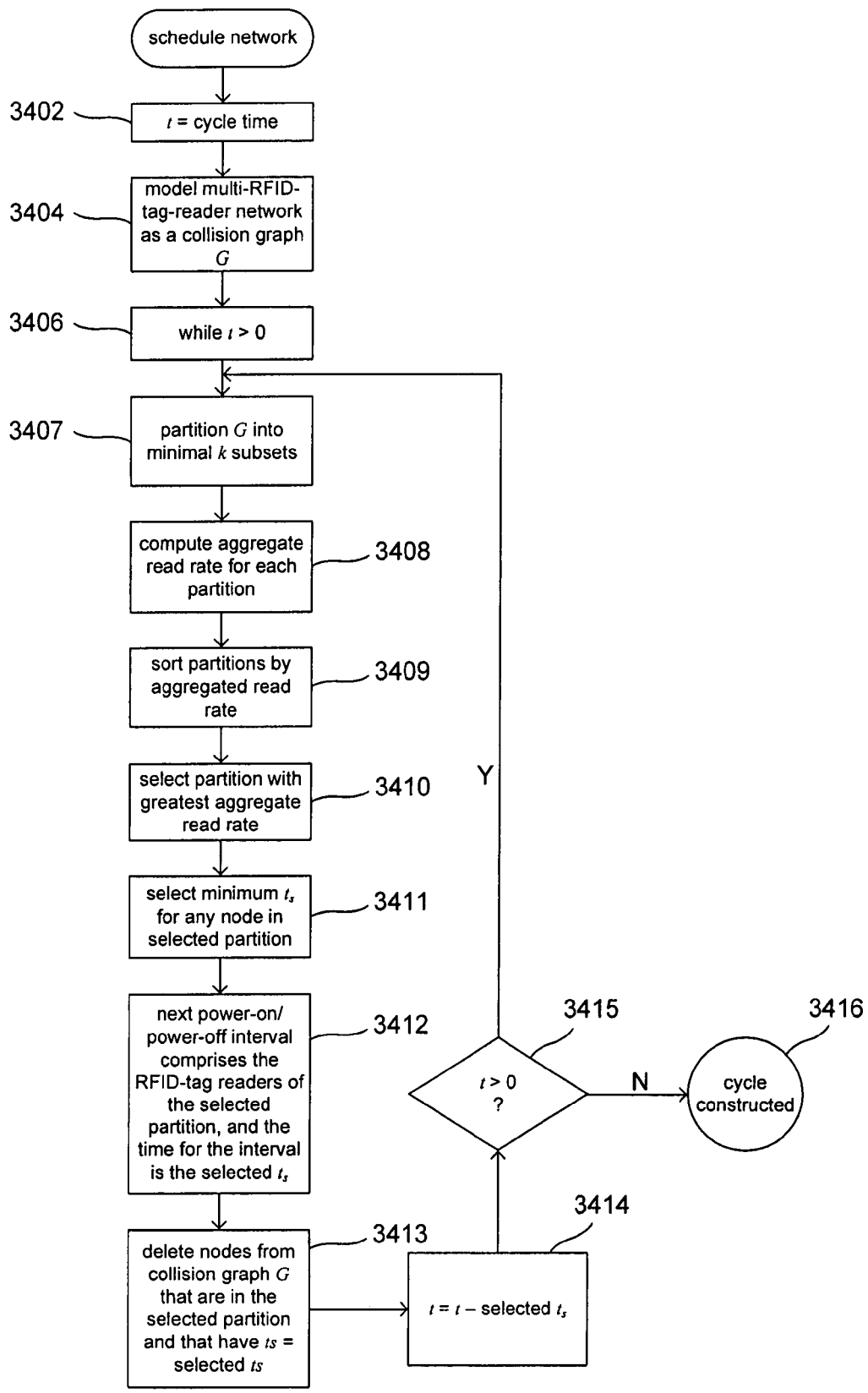
FIG. 34 shows a flow-control diagram for a routine "schedule network" that determines a schedule for a multi-RFID-tag-reader network.

FIG. 33 illustrates computing unique tags read from overlapping fields of multiple RFID-tag readers. FIG. 33 uses illustration convention used in FIG. 23, discussed above. In FIG. 33, 87 different RFID tags corresponding to an event are represented, as in FIG. 23, by small circles, such as circle 3302. The RFID tags within each of the circles 3304-3307 represent the RFID tags successfully interrogated by the RFID-tag readers $R_1$, $R_2$, $R_3$, $R_4$ represented by circles 3304-3307, respectively. For example, RFID-tag reader R1 successfully interrogates 23 RFID tags from among the total of 87 RFID tags that define the event. Overlap regions between the circles define set intersections between two or more of the sets of successfully interrogated RFID tags by individual RFID-tag readers. For example, the intersection 3308 between circles 3304 and 3305, corresponding to the RFID tags successfully read by both RFID-tag readers $R_1$ and $R_2$, denoted $R_1 \wedge R_2$, includes 6 RFID tags. Three-way intersections and a single 4-way intersection are also observed in FIG. 33. The table 3310 includes entries indicating the number of RFIID tags read by each RFID-tag reader, the number of tags in the various 2-way, 3-way, and 4-way intersections, the total number of RFID tags, and the total number of unique tags read by all four RFID-tag readers. As discussed, the cardinality of the sets of tags successfully interrogated by RFID-tag readers $R_1$, $R_2$, $R_3$, and $R_4$, divided by the total number of RFID tags in the event, are defined as the correlations of the RFID-tag readers $Corr_{R_1}$, $Corr_{R_2}$, $Corr_{R_3}$, $Corr_{R_4}$, respectively. Similarly, the various 2-way, 3-way, and 4-way set intersections divided by the total number of RFID tags in the event define 2-way, 3-way, and 4-way cross correlations, such as the 2-way cross correlation $r_{1,2}$ defined as $$\frac{R_1 \wedge R_2}{\text{total } RFID \text{ tags in the event}}.$$

The uniquely read tags can be calculated as:

unique tags = $R_1 + R_2 + R_3 + R_4 -$ $(R_1 \wedge R_2) - (R_1 \wedge R_3) -$ $(R_1 \wedge R_4) - (R_2 \wedge R_3) -$ $(R_2 \wedge R_4) - (R_3 \wedge R_4) +$ $(R_1 \wedge R_2 \wedge R_3) + (R_1 \wedge R_2 \wedge R_4) +$ $(R_1 \wedge R_3 \wedge R_4) + (R_2 \wedge R_3 \wedge R_4) -$ $(R_1 \wedge R_2 \wedge R_3 \wedge R_4)$ The aggregate correlation for all four readers, $Corr_{R_1,R_2,R_3,R_4}$, is therefore the uniquely read RFID tags divided by the total number of RFID tags in the event. In other words, the aggregate correlation can be expressed as:

$$Corr_{R_1,R_2,\ldots,R_n} = \sum_i Corr_{R_i} - \sum_{i<j} r_{i,j} + \sum_{i<j<k} r_{i,j,k} - \ldots \pm r_{1,2,\ldots,n}$$

The aggregated read rate for a set of n RFID-tag readers, such as partition or independent subgroup of RFID-tag readers within a multi-RFID-tag-reader network can then be defined as:

$$ReadRate_{R_1,R_2,\ldots,R_n} = \frac{Corr_{R_1,R_2,\ldots,R_n}}{\min(t_{s_1}, t_{s_2}, \ldots, t_{s_n})}$$

A normalized correlation, $Corr_i^S$, of an RFID-tag reader i with respect to a group of RFID-tag readers j=1 to n is defined as:

$$Corr_i^S = Corr_i \prod_{j=1}^{n} (1 - r_{i,j})$$

The normalized correlation can be computed iteratively or recursively by renormalizing the remaining nodes in a collision graph each time a node is deleted from the collision graph.

A general strategy for scheduling power-on/power-off intervals in a k-partitioned multi-RFID-tag-reader network can be obtained from the above-described considerations and quantities. The strategy is to select a first partition from among the k partitions by selecting the partition with the highest aggregated read rate. Then, the nodes in that partition are powered-on, in a first power-on interval, for a length of time equal to the smallest saturation time for any node in the partition. Following the first power-on interval, any nodes that have been powered on for their full saturation times are removed from consideration. Then, a new collision graph representing the remaining nodes is partitioned into m partitions, where m is the cardinality of a minimal partitioning of the nodes, and m is equal to, or less than, k, and a first partition from among the m partitions is selected by selecting the partition with the highest aggregated read rate based on normalization of the remaining nodes with respect to the nodes so far removed from consideration. Then, the nodes in that partition are powered-on, in a first power-on interval, for a length of time equal to the smallest saturation time for any node in the partition. The process continues until a complete cycle of power-on/power-off intervals is obtained, or, in other words, until either all readers have been powered on for their full saturation times, or sufficient power-on intervals to fill up the desired time for a cycle have been constructed. The total optimal cycle time may be the time taken by an RFID tag to travel through the narrowest field of any RFID-tag reader in the multi-RFID-tag-reader network, may be the average time taken by an RFID tag to travel through the fields of the RFID-tag readers in the multi-RFID-tag-reader network, may be empirically derived, or may be otherwise calculated or defined.

Method Embodiments of the Present Invention

A fundamental problem in clustering and partitioning RFID-tag networks is the problem of identifying, for an event E, a set of RFID-tag readers from among the RFID-tag readers in the multi-RFID-tag network that optimally or near-optimally detects or predicts an event. An event may be, as discussed above, detection of one or more tags by the RFID-tag network, or any other, arbitrarily defined occurrence to which RFID-tag-reader output may be correlated. Embodiments of the present invention address this optimization problem using computationally efficient and relatively straightforward methods. This subsection employs slightly different notational conventions than those employed in previous subsections. The method embodiments of the present invention may be applied to a set SC of RFID-tag readers in the multi-RFID-tag network, where:

$$SC = \{S_1, S_2, \ldots, S_n\}$$

The correlation between an RFID-tag reader $S_i$ and an event E is expressed as:

$$\text{corr}(S_i, E)$$

The cross-correlation between two RFID-tag readers $S_i$ and $S_j$ with respect to an event is expressed as:

$$\text{corr}(S_i, S_j)$$

In one formulation of the problem domain to which method embodiments of the present invention are addressed, a function G(S) of a subset S of the set of RFID-tag readers SC predicts or detects event $\hat{E}$:

$$\hat{E} = G(S)$$

In addition, there is a function F(S) that computes a cost associated with a subset S of RFID-tag readers of the set SC of RFID-tag readers. The cost is a constraint imposed on selected subsets of the set of RFID-tag readers SC. The cost computed by the function F(S) may be related to the amount of power needed to power on the subset of RFID-tag readers, an aggregate cost including power-on costs as well as any cost, in lifetime or longevity of individual RFID-tag readers, associated with powering on the RFID-tag readers, or any of many other individual or composite costs that may be computed and that may constrain selection of RFID-tag readers that are powered on in order to detect event E. Were there no such constraint, then it would be generally best to power on as many non-colliding RFID-tag readers with high correlations to the event E as possible. However, in general, various constraints are relevant in many real-world situations involving multi-RFID-tag-reader networks, and an optimization technique is used to identify optimal or near-optimal subsets of the RFID-tag readers in a multi-RFID-tag-reader network for predicting or detecting a particular event E.

The generalized optimization problem can then be expressed as:

$$S_{optimal} = \arg\min/S(|E-\hat{E}|+f(F(S))) = \arg\min/S(|E-G(S)|+f(F(S)))$$

where f(F(S)) is a thresholding function, such as a sigmoidal function, that operates on the cost associated with the subset S. When E and $\hat{E}$ are represented by real numbers or other numeric values, the minimized expression may be normalized with respect to E. In this expression, minimizing (|E−G(S)|) tends to increase S. However, an increase in S tends to increase F(S), thus tending to decrease $S_{optimal}$. The subset $S_{optimal}$ thus represents a balance between increasing the predictive or detection power of S while minimizing the cost associated with S. There are many sophisticated optimization techniques that may be applied to this problem. However, relatively straightforward algorithms that can be easily implemented, both as software programs and as manual procedures, may be of great use in practical situations. The method embodiments of the present invention are directed to computationally efficient methods, and systems that incorporate the methods, for selecting optimal or near-optimal subsets of RFID-tag readers for predicting or detecting an event E.

A first method-embodiment of the present invention for addressing the above-described optimization problem is provided below, in a short pseudocode description. The pseudocode is a combination of mathematical-like notation and C++-like constructs. This pseudocode-based description is not intended to in any way limit the scope of the present invention, but is instead intended to describe, in detail, an embodiment of the present invention.

First, a routine "cluster" is provided:

```
1   int numPartitions;
2   int numScanners;
3   int threshold;
4   typedef S_i = {p, corr(Si, E), sorr(S_i,S_0), corr(S_i,S_1), ...,
       corr(S_i,S_numScanners)}
5   SetOfScanners SC = {S_1, S_2, ..., S_n};
6   SetOfScanners, double cluster (SetOfScanners S, SetOfScanners C,
7              double γ, double δ, double ε, int start = 0)
8   {
9       SetOfScanners tmp1, tmp2;
10      int i, j;
11      bool res;
12      double sum;
13
14      if (C == ∅)
15      {
16          sort(S, corr(E), DESCENDING);
17          C += S_start;
18          S -= S_start;
19          if (F(C) > ε) return (C, -1);
20          else return (cluster(S, C, γ, δ, ε));
21      }
22      else
23      {
24          γ += γ_inc;
25          δ += δ_inc;
26          tmp1 = C;
27          tmp2 = ∅;
28          for (i = 0; i < size(S); i++)
29          {
30              if (Si.corr(E) >= δ)
31              {
32                  res = true;
33                  for (j = 0; j < size(C); j++)
34                  {
35                      if (Cj.p == Si.p && Si.corr(C_j) <= γ)
36                      {
37                          res = false;
38                          break;
39                      }
40                  }
41                  if (res)
```

```
42          {
43             tmp1 += Si;
44             tmp2 += Si;
45          }
46       }
47    }
48    if (F(tmp1) > ε)
49    {
50       sum= 0;
51       for (j = 0; j < size(C); j++) sum += Ci.corr(E);
52       return (C, sum);
53    }
54    else
55    {
56       S -= tmp2;
57       C += tmp2;
58       return (cluster(S, C, γ, δ, ε));
59    }
60  }
61 }
```

On lines 1-3, three constants are declared: (1) "numPartitions," the number of partitions into which the scanners, or RFID-tag readers, of an RFID-tag-reader network have been partitioned for collision avoidance; (2) "numScanners," the number of scanners, or RFID-tag readers, in the multi-RFID-tag-reader network; and (3) "threshold," a threshold value that limits an iterative search for an optimal solution, as discussed below. It is assumed that a prior partitioning of the scanners for collision avoidance has been carried out, for optimal-solution-search purposes implemented in a subsequently described routine. Then, on line 4, a type declaration for a structure associated with each scanner is provided. Each scanner $S_i$ is associated with an indication of a collision-avoidance partition p to which the scanner belongs, as a result of a previous partitioning, a correlation between the scanner and an event E, $corr(S_i,E)$, and correlations between scanner $S_i$ and all of the scanners in the multi-RFID-tag-reader network SC, $corr(S_i,S_1), \ldots, corr(S_i,S_{numScanners})\}$. On line 5, the multi-RFID-tag-reader network is represented as set SC.

The routine "cluster" comprises lines 6-61, shown above. The routine "cluster" is recursive, but can alternatively be implemented as an iterative routine. The routine "cluster" computes the cluster, or optimal or near-optimalset of scanners, for predicting or detecting event E. The routine "cluster" receives two sets of scanner subsets S and C, three threshold values γ, δ, and ε, and an integer "start." The threshold value ε is assumed to be less than the cost associated with the entire set of RFID-tag readers, S. Otherwise, an additional recursion termination condition, such as inversion of the threshold values of γ and δ, would need to be added to the routine "cluster." The subset of scanners S initially includes all of the scanners of a multi-RFID-tag-reader network, and the subset of scanners C is selected from the subset S by the routine "cluster" as an optimal subset of S for predicting or detecting event E. The threshold γ is a cross-correlation threshold, the threshold δ is an event-correlation threshold, and the threshold ε is a cost threshold.

The routine "cluster" includes a number of local variables, provided on lines 9-12. If the subset C is currently empty, as determined on line 14, then the routine "cluster" sorts the subset of scanners S in descending order based on the correlations of the members of subset S with event E, on line 16. The subset C is initialized, on line 17, to contain the element of subset S with index start, on line 17, and that element of S is removed from S on line 18. In an initial call of the routine "cluster," start generally is equal to 0. When start equals 0, C is initially set to the element of S with highest correlation with event E. If the cost associated with subset C, determined on line 19 via a call to the cost function F(C), is greater than the cost threshold ε, as determined on line 19, then the routine "cluster" returns an error. Otherwise, on line 20, the routine "cluster" recursively calls itself.

In the else statement of lines 22-60, the routine "cluster" attempts to add additional scanners to subset C, during each recursive call to the routine "cluster." First, on lines 24-25, the threshold γ is incremented and the threshold δ is decremented, in order to relax selection criteria for additional scanners. The local scanner-set variables "tmp1" and "tmp2" are initialized to equal C and the null set, respectively. In the for-loop of lines 28-47, each remaining element in subset S is evaluated against the threshold criteria, γ and δ, to determine whether or not to include the element in subset C. An element is included in subset C if its correlation coefficient with E, $S_i.corr(E)$ is greater than δ, as determined on line 30, and if the element is not in the same partition as any of the current elements of C and does not have a cross-correlation with any of the current elements of C greater than γ, as determined in the inner for-loop of lines 33-40. At the end of the for-loop of lines 28-47, a next version of the subset C has been generated from the relaxed thresholds. If the cost of this next, candidate subset C, contained in the local variable "tmp1," is greater than the cost threshold ε, as determined on line 48, then the current subset C is returned as a potential optimal set, on line 52, along with the sum of the correlation coefficients of the members of set C with respect to event E, determined on line 51. Otherwise, the newly identified elements of subset C are removed from set S, on line 56 and added to subset C on line 57, and the routine "clusters" then calls itself recursively, on line 58.

The routine "clusters" recursively builds a subset C by relaxing the thresholds δ and γ, at each recursive step, in order to incorporate a greater number of scanners into the set up until a cost threshold is exceeded. The routine "cluster" assumes that the scanners with highest correlations with respect to an event E are those scanners that, when supplied to predictive function G(S), result in the best prediction or detection of event E, $\hat{E}$.

Were the routine "cluster" to be called a single time, with the parameter start equal to 0, then an optimal or near-optimal subset C of the scanners is obtained, conditioned on the partition of the scanner with highest correlation to event E. In other words, the scanner with highest correlation to event E affects which, of the remaining scanners in the multi-RFID-tag-reader network may be selected by the routine "cluster." It may be the case that, had a scanner with a smaller correlation with event E been initially selected, a more optimal subset, as determined by the sum or correlations within the subset S, might have been obtained. Thus, the following routine "bestCluster" endeavors to repeatedly call the routine "cluster," described above, with different starting points within the ordered set of scanners SC, in order to find the most optimal subset S. Pseudocode for the routine "bestCluster" is next provided:

```
1  SetOfScanners bestCluster(double ε)
2  {
3     SetOfScanners tmp1, tmp2 = Ø;
4     double max, nxt = 0;
5     int i;
6
7     for (i = 0; i < numScanners – threshold; i++)
8     {
9        (tmp1, nxt) = cluster (SC, Ø, 0, 1, ε, i);
```

```
10      if (nxt > max)
11      {
12         max = nxt;
13         tmp2 = tmp1;
14      }
15   }
16   return tmp2;
17 }
```

In the routine "bestCluster," the routine "cluster" is repeatedly called, with successively increasing start points, in the for-loop of lines 7-15. The subset with highest cumulative correlation coefficients of members with respect to event E is selected as a final, best cluster. While the routine "bestCluster" is not guaranteed to find a true optimal subset, it is generally computationally efficient, and readily implemented and understood, may provide optimal solutions in many cases, and generally provides near-optimal solutions in those cases in which the optimal solution eludes the routine "best-Cluster."

In an alternative embodiment, an alternative routine "best-Cluster" may compute a set of clusters, in a for-loop like that of the routine "bestCluster," and then select a subset of the set of clusters, as a final cluster, with highest cumulative correlations with event E and with a cost less than a cost threshold. In this case, the multiple clusters may need to be separately powered-on during an interrogation sequence.

Figure 35:
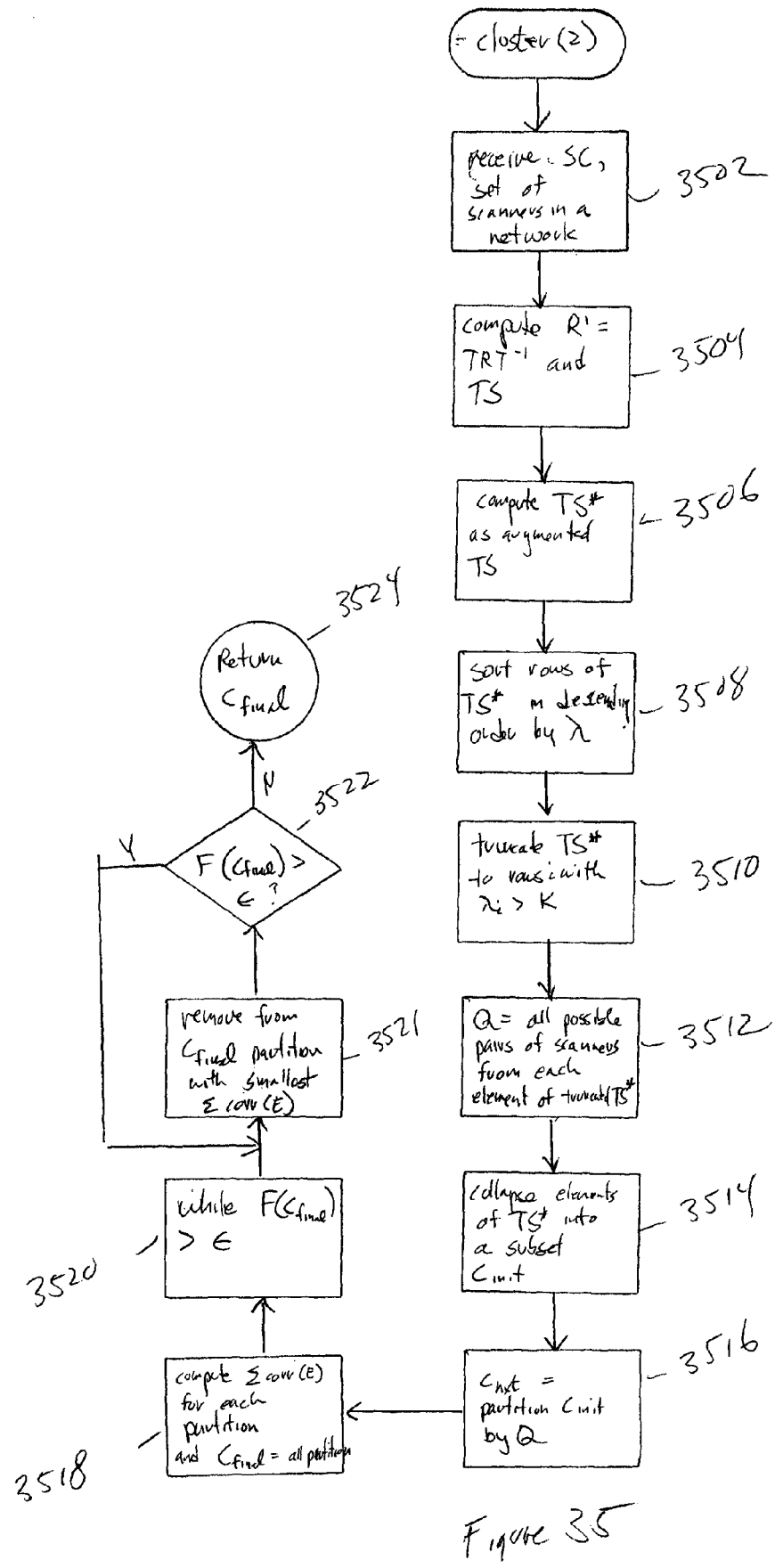
FIG. 35 shows a flow-control diagram for a second method for determining optimal or near-optimal subsets of RFID-tag readers selected from a multi-RFID-tag-reader network that represents one embodiment of the present invention.

FIG. 35 shows a flow-control diagram for a second method for determining optimal or near-optimal subsets of RFID-tag readers selected from a multi-RFID-tag-reader network. The second method for addressing the optimization problem, described above, involves matrix algebra. First, in step 3502, a cross-correlation matrix R is obtained for the entire set of RFID-tag readers within a multi-RFID-tag-reader network, as follows:

$$R = \begin{bmatrix} corr(S_0, S_0) & corr(S_0, S_1) & \cdots & corr(S_0, S_{n-1}) \\ corr(S_1, S_0) & corr(S_1, S_1) & \cdots & corr(S_1, S_{n-1}) \\ . & . & \cdots & . \\ . & . & \cdots & . \\ . & . & \cdots & . \\ corr(S_{n-1}, S_0) & corr(S_{n-1}, S_1) & \cdots & corr(S_{n-1}, S_{n-1}) \end{bmatrix}$$

The matrix R is symmetric, and, when the matrix R is not invertible and positive definite, the matrix R may be transformed, by well known transformations, to produce a matrix $\overline{R}$ that is invertible and positive definite. For example, in the case that R is not invertible, one or more RFID-tag readers may each have an output that is linearly dependent on one or more other RFID-tag readers of the multi-RFID-tag-reader network. In this case, a sufficient number of RFID-tag readers may be removed from consideration in order to remove such dependencies. Other transformation can be made to produce a positive definite matrix $\overline{R}$ with minimal changes to the values in R. In the following, it is assumed that R is invertible and positive definite, whether naturally, or by appropriate transformation. It then follows, by basic linear algebra, that all of eigenvalues $\lambda_0, \lambda_1, \ldots \lambda_{n-1}$ for R are positive. Because R is symmetric, invertible, and positive definite, R is diagonalizable. If T is a diagonalizing matrix for R, then R' is computed, in step 3504, as follows:

$$R' = TRT^{-1} = \begin{bmatrix} \lambda_0 & 0 & \cdots & 0 \\ 0 & \lambda_1 & \cdots & 0 \\ . & . & \cdots & . \\ . & . & \cdots & . \\ . & . & \cdots & . \\ 0 & 0 & \cdots & \lambda_{n-1} \end{bmatrix}$$

Applying T to a column vector of scanners $S_0, S_i, \ldots, S_{n-1}$ in step 3504 results in a linear transformation of the set of scanners to produce a set of virtual scanners, each virtual scanner comprising a set, or vector, of scanners $\{S_x, S_y, \ldots S_x\}$, where the set of scanners that together comprise a particular virtual scanner may have between 1 and n members selected from the original set of scanners:

$$TS = T \begin{bmatrix} S_0 \\ S_1 \\ S_2 \\ \vdots \\ S_{n-1} \end{bmatrix} = \begin{bmatrix} (S_x, S_y, \ldots, S_z)_0 \\ (S_x, S_y, \ldots, S_z)_1 \\ (S_x, S_y, \ldots, S_z)_2 \\ \vdots \\ (S_x, S_y, \ldots, S_z)_{n-1} \end{bmatrix}$$

The virtual-scanner vector elements of TS are pair-wise uncorrelated. It is well known, from linear algebra, that the magnitudes of the diagonal eigenvalues of R', $\lambda_0, \lambda_1, \ldots, \lambda_{n-1}$, are indicative of the relative information-providing potentials of the virtual scanners. In step 3506, an augmented matrix TS* is formed, in which the virtual-scanner vectors are paired with the corresponding eigenvalues from matrix R' as follows:

$$TS^* = \begin{bmatrix} (S_x, S_y, \ldots, S_z)_0 & | \lambda_0 \\ (S_x, S_y, \ldots, S_z)_1 & | \lambda_1 \\ (S_x, S_y, \ldots, S_z)_2 & | \lambda_2 \\ . & | . \\ . & | . \\ . & | . \\ (S_x, S_y, \ldots, S_z)_{n-1} & | \lambda_{n-1} \end{bmatrix}$$

In step 3508, his augmented matrix can then be row sorted by $\lambda$ value in descending order to produce a sorted list of virtual scanners with greatest to least information content. Then, the sorted list of virtual scanners can be truncated, in step 3510, by retaining only those virtual scanners with $\lambda$ values greater than a threshold $\lambda$ value K, and removing the virtual scanners with $\lambda$ values less than or equal to K, to produce a final list of virtual scanners with high information-providing potential with respect to event E.

The virtual scanners, as discussed above, are each vectors of scanners selected from the multi-RFID-tag-reader network. The truncated list of virtual scanners may be collapsed into a set of unique scanners included in the virtual scanners, as a final cluster. However, when each virtual scanner is separately considered, it can be concluded that no two scanners in a virtual scanner should be simultaneously powered on. If the two scanners collide, then they should not, of course, be powered on together. However, if the two scanners do not collide, then their sensor fields do not overlap, and therefore, since they are all correlated with event E, it is not possible for signal-producing components associated with event E to simultaneously lie within both of their scanner fields. It would be wasteful, in the latter case, for both scanners to be powered on simultaneously. Therefore, each virtual scanner gives rise to a set of pairwise constraints. All of the pairwise constraints for all of the virtual scanners can be collected together, in step 3512, and applied in a partitioning method, in step 3516, to partition the set of all scanners that occur within the selected set of virtual scanners, obtained by collapsing the virtual scanners into a single set of constituent scanners, in step 3514, in order to produce a set of partitions corresponding to the cluster obtained by the above-discussed matrix methods. Then, these partitions may be ranked by cumulative correlations of members of the partitions with event E, in step 3518, and then ranked partitions successively removed from the cluster, in the for-loop of steps 3520-3522, until the cost of the cluster falls below a threshold value $\epsilon$. In this second method embodiment of the present invention, when multiple partitions are added to the cluster, the cluster needs multiple, corresponding power-on-power-off cycles to be undertaken in order to employ the cluster for predicting or detecting event E.

Although the present invention has been described in terms of particular embodiments, it is not intended that the invention be limited to this embodiment. Modifications within the spirit of the invention will be apparent to those skilled in the art. For example, Although the present invention has been described in terms of particular embodiments, it is not intended that the invention be limited to these embodiments. Modifications within the spirit of the invention will be apparent to those skilled in the art. For example, any number of different embodiments of the present invention may be implemented using different programming languages, different modular organizations, different control structures, different variables, different data structures, and by varying other such programming parameters. The method embodiments of the present invention may be incorporated into a wide variety of different RFID-tag networks and multi-RFID-tag-network analysis systems. Variations of the two, above-described methods are possible. For example, the first method may be further elaborated to more completely search the total search space. Thresholds and threshold-based tests may vary, including test greater-than-or-equal to and less-than-or-equal to, rather than greater than or less than, inverted test for reciprocal thresholds, and by other such variations. The first clustering method may be implemented as a recursive function or as an iterative function. In certain cases, additional steps of generating multiple clusters from which to select a final cluster may be omitted, in both clustering methods, for computational efficiency.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for predicting a subset C from a set SC, comprising all multi-RFID-tag-readers in a multi-RFID-tag-reader network, wherein the subset C detects an event E with an increased accuracy in comparison to the set SC, the method comprising:
  partitioning the RFID-tag-readers in the set SC for collision avoidance;
  receiving threshold parameters including an index start;
  sorting the set SC in descending order based on the correlation of each RFID-tag-reader in the set SC with the event E, where the index start is set to one of the multi-RFID-tag-readers of the set SC with a highest correlation with event E;
  initializing the set C to contain the one RFID-tag-reader of the set SC with the index start;
  identifying candidate RFID-tag-readers in SC that meet a criterion defined by the threshold parameters,
  repeatedly relaxing the threshold parameters,
  adding an identified candidate RFID-tag-reader to the subset C; and
  removing the identified candidate RFID-tag-reader from the set SC until a cost computed for subset C exceeds a threshold cost.

2. The method of claim 1 wherein the threshold parameters include a threshold event correlation and a threshold cross correlation.

3. The method of claim 2 wherein the criterion defined by the threshold parameters is that the event correlation for a candidate RFID-tag-reader exceeds, in value, the threshold event correlation and that the cross correlation of the identified candidate RFID-tag-reader with respect to each RFID-tag-reader in the subset C is less that the cross-correlation threshold.

4. The method of claim 3 wherein the criterion defined by the threshold parameters further includes that the identified candidate RFID-tag-reader not be assigned to a collision-avoidance partition to which the RFID-tag-readers in the subset C are assigned.

5. The method of claim 4 wherein multiple clusters are obtained by multiple iterations of the method of claim 1, and a subset of these clusters are coalesced to produce a final subset C of RFID-tag readers.

6. The method of claim 2 wherein relaxing the threshold parameters further includes: decreasing the event-correlation threshold and increasing the cross-correlation threshold.

7. The method of claim 1, further comprising successively increasing a numerical value of the start index to create a number of sets of RFID-tag reader clusters, wherein each cluster has a different index start.

8. A method for predicting a subset C from a set SC, comprising all multi-RFID-tag-readers in a multi-RFID-tag-reader network, wherein the subset C detects the event E with an increased accuracy in comparison to the set SC, the method comprising:
  partitioning the RFID-tag-readers in the set SC for collision avoidance;
  computing a cross-correlation matrix R for the RFID-tag-readers in the set SC with respect to the event E;
  computing a diagonalized cross-correlation matrix R' by: $R'=TRT^{-1}$, wherein T is a diagonalizing matrix for R;
  computing a set of virtual scanners by matrix multiplication of T and S: TS, wherein S is a vector of scanners;
  sorting the set of virtual scanners by corresponding eigenvalues in $R^{-1}$;
  and truncating the sorted set of virtual scanners to form the subset C.

9. The method of claim 8 wherein each virtual scanner in the set of virtual scanners is a set of one or more RFID-tag-readers of the multi-RFID-tag-reader network.

10. The method of claim 9 wherein the sorted set of virtual scanners is truncated by removing virtual scanners associated with eigenvalues less than a threshold eigenvalue K.

11. The method of claim 10 further including:
producing a set of partitioning constraints by adding pair-wise constraints of the RFID-tag-readers in the subset C; and
partitioning the set of RFID-tag-readers within the subset C.

12. The method of claim 11 further including selecting a subset of RFID-tag-readers with a cumulative highest correlation with event E and with a cost less than a cost threshold.

13. The method of claim 7, further comprising selecting a cluster from the number of sets of RFID-tag reader clusters that has a highest cumulative correlation coefficient with respect to the event E.

* * * * *

UNITED STATES PATENT AND TRADEMARK OFFICE
CERTIFICATE OF CORRECTION

PATENT NO. : 8,149,094 B2  
APPLICATION NO. : 11/799146  
DATED : April 3, 2012  
INVENTOR(S) : Vinay Deoalikar et al.

Page 1 of 1

It is certified that error appears in the above-identified patent and that said Letters Patent is hereby corrected as shown below:

In the Claims

In column 24, line 33, in Claim 3, delete "that" and insert -- than --, therefor.

Signed and Sealed this  
Twenty-eighth Day of May, 2013

Teresa Stanek Rea  
*Acting Director of the United States Patent and Trademark Office*